United States Patent
Papot et al.

(10) Patent No.: US 12,459,928 B2
(45) Date of Patent: Nov. 4, 2025

(54) THERAPEUTIC VECTORS AND PRODRUGS FOR TREATING CANCERS

(71) Applicants: SEEKYO, Futuroscope (FR); CENTRE NATIONAL DE LA RECHERCHE SCIENTIFIQUE, Paris (FR)

(72) Inventors: Sébastien Papot, Poitiers (FR); Brigitte Renoux, Nouaille Maupertuis (FR); Rémi Chatre, Poitiers (FR)

(73) Assignees: SEEKYO, Futuroscope (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 941 days.

(21) Appl. No.: 17/595,012

(22) PCT Filed: May 6, 2020

(86) PCT No.: PCT/EP2020/062617
§ 371 (c)(1),
(2) Date: Nov. 5, 2021

(87) PCT Pub. No.: WO2020/225323
PCT Pub. Date: Nov. 12, 2020

(65) Prior Publication Data
US 2022/0227741 A1    Jul. 21, 2022

(30) Foreign Application Priority Data
May 6, 2019 (EP) .................... 19305574

(51) Int. Cl.
*A61K 47/64* (2017.01)
*A61K 47/54* (2017.01)
*A61K 47/55* (2017.01)
*C07D 405/14* (2006.01)

(52) U.S. Cl.
CPC .......... *C07D 405/14* (2013.01); *A61K 47/549* (2017.08); *A61K 47/55* (2017.08); *A61K 47/643* (2017.08)

(58) Field of Classification Search
None
See application file for complete search history.

(56) References Cited

FOREIGN PATENT DOCUMENTS

| WO | 2015118497 A1 | 8/2015 |
| WO | 2018210824 A1 | 11/2018 |
| WO | 2019081455 A1 | 5/2019 |

*Primary Examiner* — Layla D Berry
(74) *Attorney, Agent, or Firm* — McNees Wallace & Nurick LLC

(57) ABSTRACT

The present invention relates to a compound having the following formula (I):

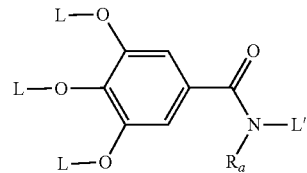

Figure 1:
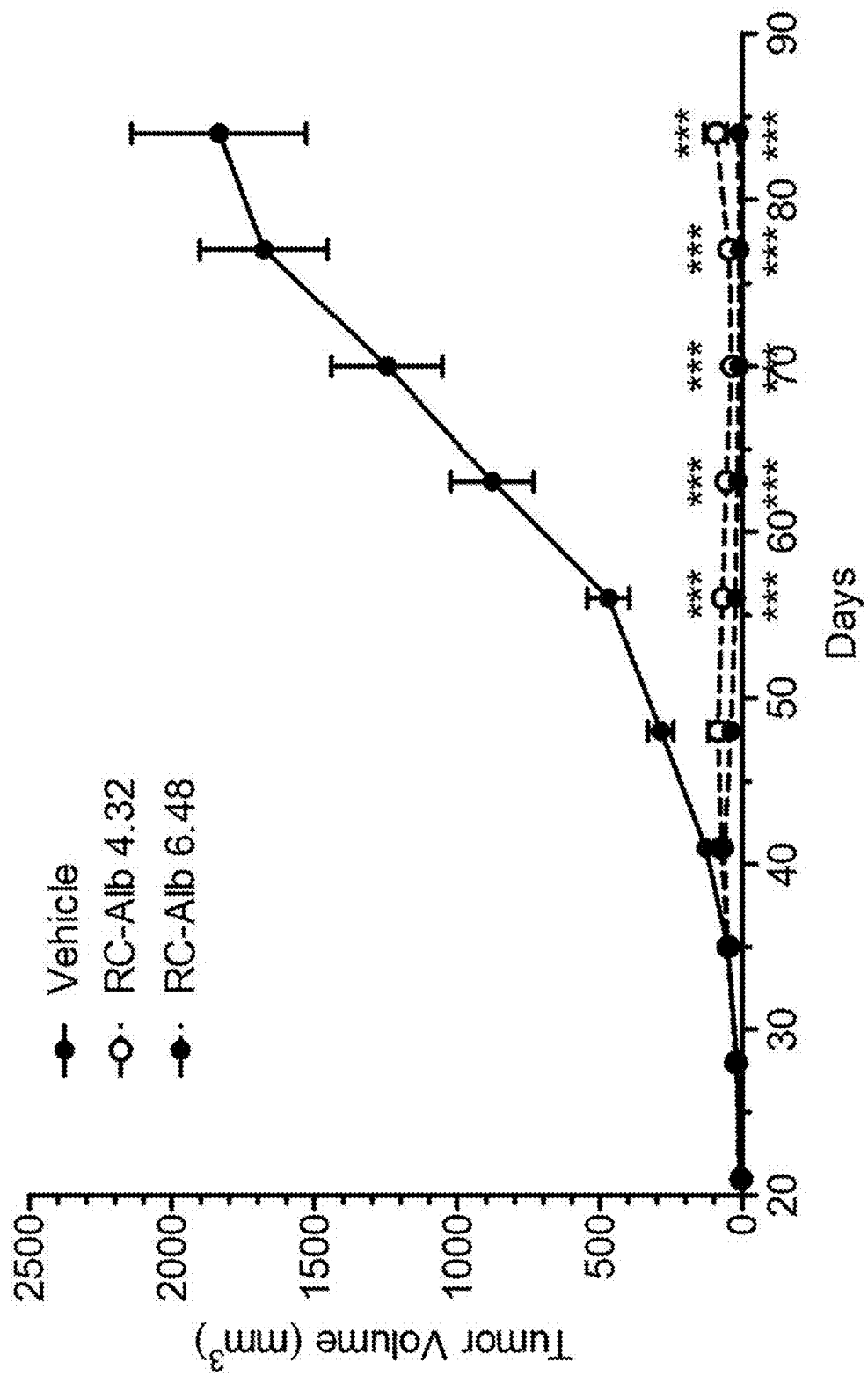

as well as the corresponding prodrugs, pharmaceutical compositions comprising said compounds, in particular for treating cancer.

16 Claims, 4 Drawing Sheets

THERAPEUTIC VECTORS AND PRODRUGS FOR TREATING CANCERS

The present invention concerns new therapeutic vectors allowing the fixation of anticancer agents, as well as their corresponding prodrugs. It also concerns said vectors and prodrugs for their use for the treatment of cancers.

Cancer is among the most common pathologies at the current time. In particular, cancer is today one of the primary causes of mortality in France and in most industrialized countries. Death usually results from the development of metastasis and the lack of curative approaches, at least for the most frequent tumor localization: breast, colorectal, prostate, pancreas and lung cancers. At this latter stage of the disease, cancer chemotherapy remains the most powerful and often the only available therapeutic approach. However, chemotherapy is not entirely effective against many common solid tumor types. Most anticancer drugs lack any intrinsic antitumor selectivity. In turn, chemotherapy is frequently associated with severe side effects due to the destruction of normal tissues. As a result, the amount of drug that can be administered is usually insufficient to deliver a lethal concentration of anticancer agent at the tumor site. Moreover, the lack of selectivity of cytotoxic drugs dramatically increases the risk of development of cellular resistance by tumor cells. Thus, in view of non-specific toxicity of most anticancer drugs, the development of more selective chemotherapeutic approaches represents a major interest in combating cancer.

Within this framework, numerous research efforts focused on the development of self-responsive chemical systems programmed to deliver potent cytotoxics selectively at the tumor site. Such systems are usually complex molecular assemblies that build into their structure (1) a targeting unit enabling the recognition of a tumor-associated specificity and (2) either an enzymatic or a chemical trigger that can be activated exclusively in cancerous tissues to induce the release of the drug in a stringently controlled fashion.

The vast majority of the drug delivery systems that have been developed until now were designed to target cancer cell surface specificities (e.g. a membrane receptor or an antigen). In this approach, the molecular assembly includes either a monoclonal antibody or low-molecular-weight ligand that displays a high affinity for the corresponding tumor-associated cell surface marker. When cancer cell surface is detected by the targeting unit, the whole system is internalized via receptor-mediated endocytosis. Once inside the cell, activation of the trigger leads to the release of the active drug selectively in the intracellular medium. Several drug delivery systems of this type are currently being assessed clinically for diverse applications in oncology.

However, the "Achilles' heel" of drug delivery systems designed to target cell surface specificities relies on the heterogeneity of cancerous tissues. Indeed, all the cells of a tumor mass are not identical exhibiting different concentrations of a given cell surface marker. Thus, only cancer cells that express the selected tumor-associated marker at a sufficient level are directly affected by this class of targeting systems. In this context, the use of enzyme-responsive prodrugs that can be selectively activated by the corresponding enzyme naturally overexpressed in the tumor microenvironment offers a valuable alternative to this targeting approach. In this case, the anticancer agent is released in the extracellular medium and can further penetrate passively inside various types of surrounding malignant cells whatever their membrane characteristics.

The aim of the present invention is thus to provide systems for the selective release of anticancer agents in the tumor microenvironment.

Therefore, the present invention relates to a compound having the following formula (I):

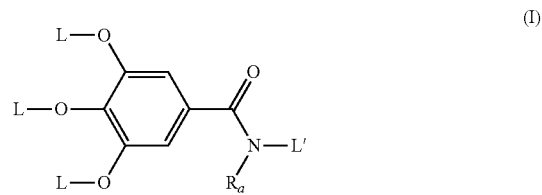

wherein:
  $R_a$ represents H or a $(C_1\text{-}C_{12})$alkyl group, optionally interrupted with one or several oxygen atoms, $R_a$ being preferably H;
  L represents a group having the following formula (II):

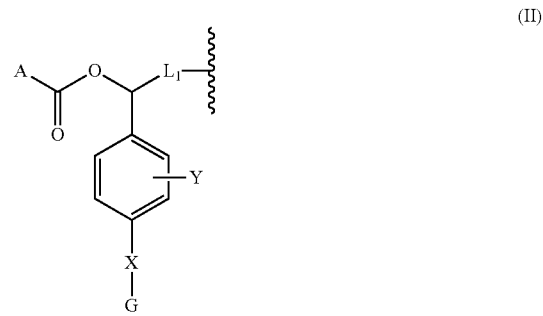

wherein:
  A is an anticancer agent;
  Y is an electron-withdrawing group;
  X is —O—;
  G is a glucuronyl radical or a derivative thereof;
  $L_1$ represents a linker represented by the following formula (III):

wherein:
  $A_1$ is an $(C_1\text{-}C_6)$alkylene radical;
  $A_2$ is a group obtainable by click chemistry;
  $A_3$ is an $(C_1\text{-}C_6)$alkylene radical;
  $A_4$ is chosen from the group consisting of: —C(=O)—NR$_b$—, —C(=S)—NR$_b$—, —NR$_b$—C(=O)—, —NR$_b$—C(=S)—, and NR$_b$, $R_b$ representing H or a $(C_1\text{-}C_{12})$alkyl group;
  $A_4$ being preferably a —C(=O)—NR$_b$— group, and more preferably —C(=O)—NH—,
  $A_5$ is a $(C_1\text{-}C_{32})$alkylene radical interrupted by at least one oxygen atom, preferably a $(C_1\text{-}C_6)$alkylene radical interrupted by at least one oxygen atom, and is more preferably a polyoxyalkylenated radical,
  $A_6$ is a group obtainable by click chemistry; and
  $A_7$ is an $(C_1\text{-}C_6)$alkylene radical;
  L' represents a group having the following formula (IV):

wherein:
- $A_8$ is an $(C_1-C_6)$alkylene radical interrupted by at least one oxygen atom, and is preferably a polyoxyalkylenated radical;
- $A_9$ is chosen from the group consisting of: —NR$_c$—, —O—, and —S—, R$_c$ representing H or a $(C_1-C_{12})$ alkyl group; and
- L" is a radical capable of reacting with an amino, hydroxyl or thiol function;

or a pharmaceutically acceptable salt thereof, or a racemate, diastereomer or enantiomer thereof.

The compounds of the invention are compounds having a gallic acid structure that allow the fixation of three molecules of anticancer agent (A) through the linker L.

The compounds herein described may have asymmetric centers. Compounds of the present invention containing an asymmetrically substituted atom may be isolated in optically active or racemic forms. It is well-known in the art how to prepare optically active forms, such as by resolution of racemic forms or by synthesis from optically active starting materials. All chiral, diastereomeric, racemic forms and all geometric isomeric forms of a compound are intended, unless the stereochemistry or the isomeric form is specifically indicated.

The term "pharmaceutically acceptable salt" refers to salts which retain the biological effectiveness and properties of the compounds of the invention and which are not biologically or otherwise undesirable. In many cases, the compounds of the invention are capable of forming acid and/or base salts by virtue of the presence of amino and/or carboxyl groups or groups similar thereto. Pharmaceutically acceptable acid addition salts may be prepared from inorganic and organic acids, while pharmaceutically acceptable base addition salts can be prepared from inorganic and organic bases. For a review of pharmaceutically acceptable salts see Berge, et al. ((1977) J. Pharm. Sd, vol. 66, 1). The expression "non-toxic pharmaceutically acceptable salts" refers to non-toxic salts formed with nontoxic, pharmaceutically acceptable inorganic or organic acids or inorganic or organic bases. For example, the salts include those derived from inorganic acids such as hydrochloric, hydrobromic, sulfuric, sulfamic, phosphoric, nitric, and the like, as well as salts prepared from organic acids such as acetic, propionic, succinic, glycolic, stearic, lactic, malic, tartaric, citric, ascorbic, pamoic, maleic, hydroxymaleic, phenylacetic, glutamic, benzoic, salicyclic, sulfanilic, fumaric, methanesulfonic, and toluenesulfonic acid and the like.

As mentioned above, A is an anticancer agent.

According to an embodiment, the anticancer agent is selected from cytostatics, antimetabolites, DNA intercalating substances, topoisomerase I and II inhibitors, tubulin inhibitors, alkylating agents, neocarzinostatin, calicheamycin, dynemicin or esperamycin A, ribosome inhibitors, tyrosine phosphokinase inhibitors, compounds inducing cellular differentiation, histone deacetylase inhibitors, small molecules immuno-modulators or small molecules targeting cancer stem cells.

Even more particularly, the anticancer agent according to the invention is selected from cytostatics and antimetabolites, such as 5-fluorouracil, 5-fluorocytidine, 5-fluorouridine, cytosine arabinoside or methotrexate, from DNA intercalating substances such as doxorubicin, daunomycin, idarubicin, epirubicin or mitoxantrone, from topoisomerase I and II inhibitors, such as camptothecin, etoposide or m-AMSA, from tubulin inhibitors, such as vincristine, vinblastine, vindesine, taxol, nocodazole or colehicin, from alkylating agents, such as cyclophosphamide, mitomycin C, rachelmycin, cisplatin, mustard gas phosphoramide, melphalan, bleomycin, N-bis(2-chloroethyl)-4-hydroxyaniline, or from neocarzinostatin, calicheamicin, dynemicin or esperamycin A, or from ribosome inhibitors, such as verrucarin A, from tyrosine phosphokinase inhibitors, such as quercetin, genistein, erbstatin, tyrphostin or rohitukin and derivatives thereof, from compounds inducing cellular differentiation, such as retinoic acid, butyric acid, phorbol esters or aclacinomycin, from histone deacetylase inhibitors, such as CI-994 or MS275, from immuno-modulators, such as Imiquimod, and from small molecules targeting cancer stem cells, such as hedgehog inhibitors like cyclopamine derivatives.

According to a preferred embodiment, A is an anticancer agent comprising at least one primary or secondary amine function.

Preferably, according to the invention, the anticancer agent A is modified in order to be able to bind to the —C(=O)—O— group of the L group of formula (II) as mentioned above.

According to an embodiment, A is a radical of the dolastatin family or a derivative thereof. In the context of the present invention, a "derivative" of the dolastatin family refers to a compound which is structurally very related and which remains in possession of equivalent biological properties and in particular of a capacity to inhibit tubulin polymerization, in order to ultimately inhibit cell mitosis. It may in particular be a question of substitution or deletion derivatives.

The dolastatin family represents a class of compounds having a structure of at least 4 amino acids, at least 3 of which are specific thereto, i.e. different from the 20 amino acids most commonly found naturally.

Reference may in particular be made to document WO 2004/010957, which describes compounds in accordance with those that are suitable for the present invention.

In one particularly preferred embodiment of the invention, A represents a radical which derives from dolastatin 10, from auristatin PE, from auristatin E, from monomethyl auristatin E and derivatives thereof, preferably a radical which derives from monomethyl auristatin E or a derivative thereof.

The structural difference between dolastatin 10 and the synthetic compounds of the auristatin subfamily lies in particular in the substitution of the aminothiazolephenethyl group in the C-terminal position of dolastatin 10, by a norephedrine unit in the case of auristatin PE, of auristatin E or of monomethyl auristatin.

For the purposes of the invention, a derivative of dolastatin 10, of auristatin PE, of auristatin E or of monomethyl auristatin E has a chemical structure very related to at least one of its active agents and has antimitotic properties attributed to the compounds of the dolastatin family. Its structural difference(s) may in particular be, for example, a substitution on at least one side chain of at least one of the four amino acids of which it is composed. This substitution may be carried out so as to contain or represent a linear, cyclic and/or branched alkyl group, an aryl group, a heterocycle or a carbocycle. This structural difference may also consist of a modification of a dolostatin 10, auristatin PE or auristatin E molecule, for example at the level of its tertiary amine in the N-terminal position, so as to render this function compatible with the establishment of a covalent bond with the linker arm under consideration.

According to a preferred embodiment, the anticancer agent A is the monomethyl auristatin E (MMAE) or a derivative thereof.

Preferably, A is represented by the following formula (A-1):

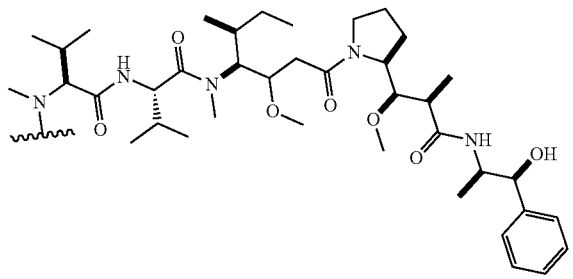 [SMILES: *N(C)[C@H](C(=O)N[C@H](C(=O)N(C)[C@H](C(CC(=O)N1CCC[C@H]1[C@H](OC)[C@@H](C)C(=O)N[C@H](C)[C@@H](O)c1ccccc1)OC)[C@@H](C)CC)C(C)C)C(C)C]

In the context of the present invention, an "electron-withdrawing radical" refers to the property of an atom or of a group of atoms of withdrawing electrons.

Preferably, in formula (II), Y is an electron-withdrawing group selected from the group consisting of: halogen, $NO_2$, and $CF_3$. More preferably, Y is $NO_2$.

As mentioned above, in formula (II), G is a glucuronyl radical or a derivative thereof.

In the context of the present invention, G is dedicated to being removed enzymatically, in order to thus provide an intramolecular rearrangement of the linker arm linking it to the molecule of the dolastatin family and, consequently, results in release of this active molecule (A radical).

Furthermore, a glucuronyl radical according to the invention, which is enzymatically hydrolyzable, may confer a tissue and/or cell specificity on the conjugates and prodrugs in accordance with the present invention.

It is known that β-glucuronidase is an enzyme naturally present at a high concentration in the neighborhood of many tumors. The conjugates and prodrugs of the invention comprising a glucuronyl group may therefore be advantageously activated at the extracellular level, during prodrug monotherapies (or PMTs). In the context of the invention, the term "activation" refers to the release at the tumor site, for example, of the radical of the family of dolastatins, which are thus capable of performing their antimitotic biological activity.

In the context of the present invention, a "derivative" of the glucuronyl radical refers to a compound which is structurally very related and which remains in possession of equivalent biological properties and in particular of a capacity to be the enzymatic substrate of a β-glucuronidase. It may in particular be a question of derivatives of substitution or deletion of one or more hydroxyl (—OH) group(s) or of the carboxylic (—COOH) group.

As derivatives of glucuronyl radicals, the glucuronide ester radicals may be mentioned.

As mentioned above in formula (II), the linker L also comprises another divalent linker $L_1$ that is directly bound to the oxygen atoms of the gallic acid structure of the compounds of the invention.

In other words, each $A_7$ of the linker $L_1$ corresponds to the end-terminal group of each L group linked to each oxygen atom of the gallic acid structure. $A_7$ is thus linked to the oxygen atom bearing the L group.

Within the present application, the term "alkyl" means a saturated or unsaturated aliphatic hydrocarbon group which may be straight or branched having, unless otherwise specified, 1 to 12 carbon atoms in the chain. Preferred alkyl groups have 1 to 6 carbon atoms in the chain. "Branched" means that one or lower alkyl groups such as methyl, ethyl or propyl are attached to a linear alkyl chain. "Lower alkyl" means 1 to 4 carbon atoms in the chain which may be straight or branched.

The term "alkylene" as employed herein refers to a divalent radical comprising, unless otherwise specified, from 1 to 6 carbon atoms. Said radical may be represented by the formula $(CH_2)_n$ wherein n is an integer varying from 1 to 6.

According to the invention, in formula (III), $A_2$ and $A_6$ are groups obtainable by click chemistry. These radicals are thus obtained by a click chemistry reaction.

These click chemistry reactions include in particular the cycloadditions of unsaturated compounds, among which one may cite the Diels-Alder reactions between a dienophile and a diene, and especially also the azide-alkyne 1,3-dipolar cycloadditions, and preferably the copper-catalyzed azide-alkyne cycloaddition (CuAAC).

Other click chemistry reactions include reactions involving a thiol function such as the formation of thioethers from an alkene and mixed disulfides, and also reactions involving an electrophilic carbonyl group of the non-aldol type, for example the formation of oxime ethers from an oxyamine, of hydrazones from a hydrazine or also the formation of thiosemicarbazones from a thiosemicarbazine.

As click chemistry reactions, one may also cite reactions involving thiocarboxylic acids or thioesters to lead to the formation of thioesters and amides, and also the reactions between azides and phosphines (such as Staudinger ligations).

Preferably, the radicals $A_2$ and $A_6$ are obtained by the reaction between two reactive functions, said reaction being selected from the group consisting of:

the reaction between an azide and an alkyne, the reaction between an aldehyde or ketone and an hydrazide, the reaction between an aldehyde or ketone and an oxyamine, the reaction between an azide and a phosphine, the reaction between an alkene and a tetrazine, the reaction between an isonitrile and a tetrazine, and the reaction between a thiol and an alkene (thiol-ene reaction).

According to a preferred embodiment, $A_2$ and $A_6$ are triazole radicals.

Preferably, $A_2$ of formula (III) is a triazole radical, preferably a radical having the following formula (V):

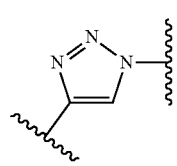

(V)

Preferably, $A_6$ of formula (III) is a triazole radical, preferably a radical having the following formula (VI):

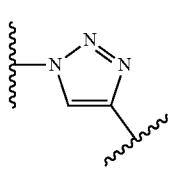

(VI)

According to an embodiment, L has the following formula (VII):

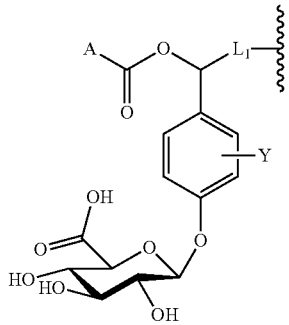

(VII)

A, Y, and $L_1$ being as defined above.

Preferably, in formula (VII), Y is a nitro group.

Preferably, in formula (VII), A is the monomethyl auristatin E (MMAE) or a derivative thereof, more preferably having the formula (A-1) as defined above.

According to an embodiment, L has the following formula (VIII):

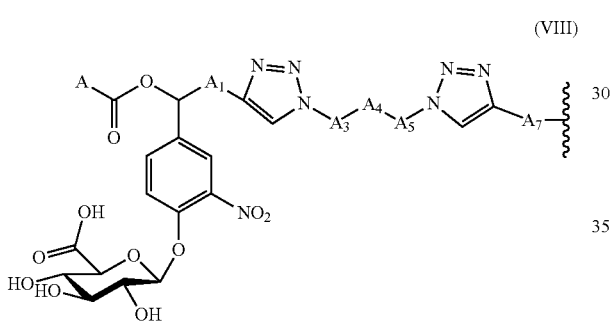

(VIII)

A, $A_1$, $A_3$, $A_4$, $A_5$, and $A_7$ being as defined above.

Preferably, in formula (VII), A is the monomethyl auristatin E (MMAE) or a derivative thereof, more preferably having the formula (A-1) as defined above.

According to an embodiment, in formula (VIII), $A_4$ is —C(=O)—NH—.

According to an embodiment, in formula (VIII), $A_5$ represents a group of formula —$CH_2$—($CH_2$—O—$CH_2$)$_n$—$CH_2$—, n being an integer comprised from 1 to 12.

The present invention relates to compounds having the formula (I) as defined above, wherein L has the following formula (IX):

i being an integer comprised from 1 to 6,
j being an integer comprised from 1 to 10,
n being an integer comprised from 1 to 12, and
k being an integer comprised from 1 to 6.

Preferably, in formula (IX), i=1.
Preferably, in formula (IX), j=4.
Preferably, in formula (IX), n=10.
Preferably, in formula (IX), k=1.

In formula (I), as mentioned above, L" (which is bound to the gallic acid structure through the linker L') is a radical capable of reacting with an amino, hydroxyl or thiol function.

In the context of the present invention, a "radical capable of reacting with an amino, hydroxyl or thiol function" refers to a radical, generally a hydrocarbon-based radical, which has a chemical function, or unit, capable of interacting with a free secondary amino, hydroxyl or thiol function and of thus establishing a covalent bond between a conjugate molecule and a distinct chemical entity carrying this function compatible with producing this covalent function. In the context of the present invention, this distinct chemical entity is more particularly a macromolecule naturally present in a living organism and advantageously an endogenous albumin molecule, like human serum albumin.

According to a preferred embodiment, L" comprises a maleimide radical.

According to a preferred embodiment, L" has the following formula:

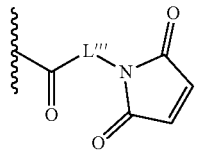

wherein L''' is a ($C_1$-$C_{12}$)alkylene radical, optionally substituted with an electron-withdrawing group, in particular a halo($C_1$-$C_6$)alkyl group, such as $CF_3$, or a phenylene radical, optionally substituted with an electron-withdrawing group, in particular a halogen.

According to a preferred embodiment, L" is a maleimidocaproyl group.

According to a preferred embodiment, L" is a radical having one of the following formulae:

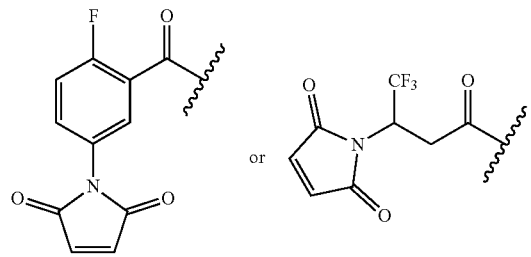 [SMILES: *C(=O)c1cc(N2C(=O)C=CC2=O)ccc1F ; *C(=O)CC(N1C(=O)C=CC1=O)C(F)(F)F]

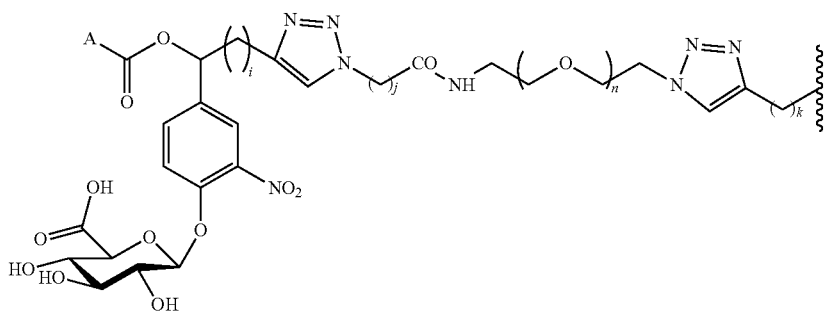

(IX)

According to an embodiment, in formula (IV), $A_8$ represents a group of formula $-CH_2-(CH_2-O-CH_2)_m-CH_2-$, m being an integer comprised from 1 to 12, and being in particular equal to 3.

The present invention relates to compounds having the formula (I) as defined above, wherein L' has the following formula (X):

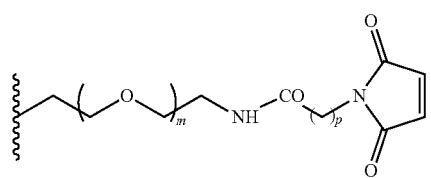

(X)

m being an integer comprised from 1 to 6, preferably 3, and p being an integer comprised from 1 to 6, preferably 5.

According to an embodiment, the compounds of the invention, which may also be named conjugates, have the formula (I) as defined above, wherein the linker L has the formula (VII), preferably (VIII), and more preferably (IX), as defined above and the linker L' has the formula (X) as defined above.

The preferred compound of the invention has the following formula (XI):

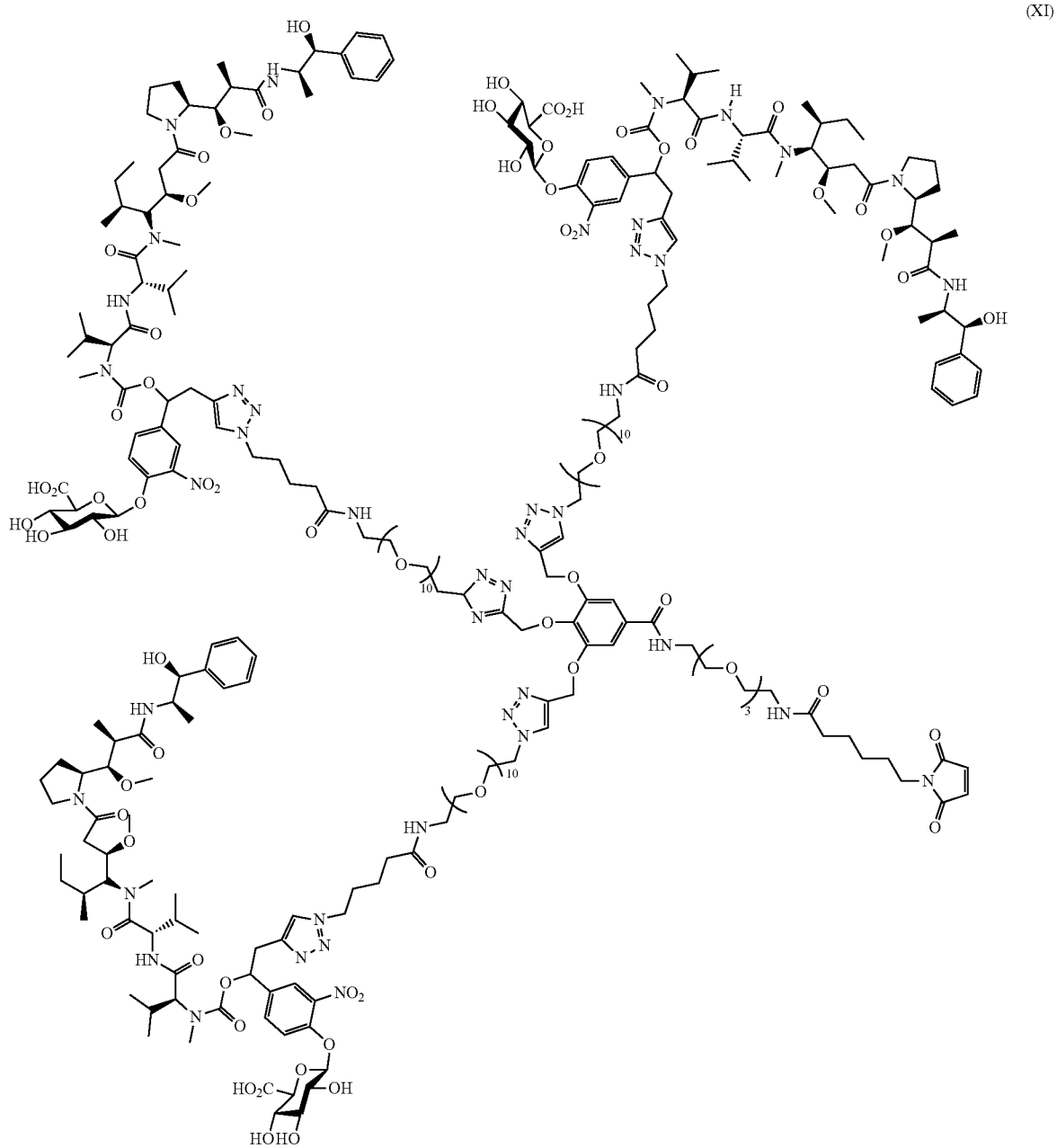

(XI)

Another preferred compound of the invention has the following formula (XI'):
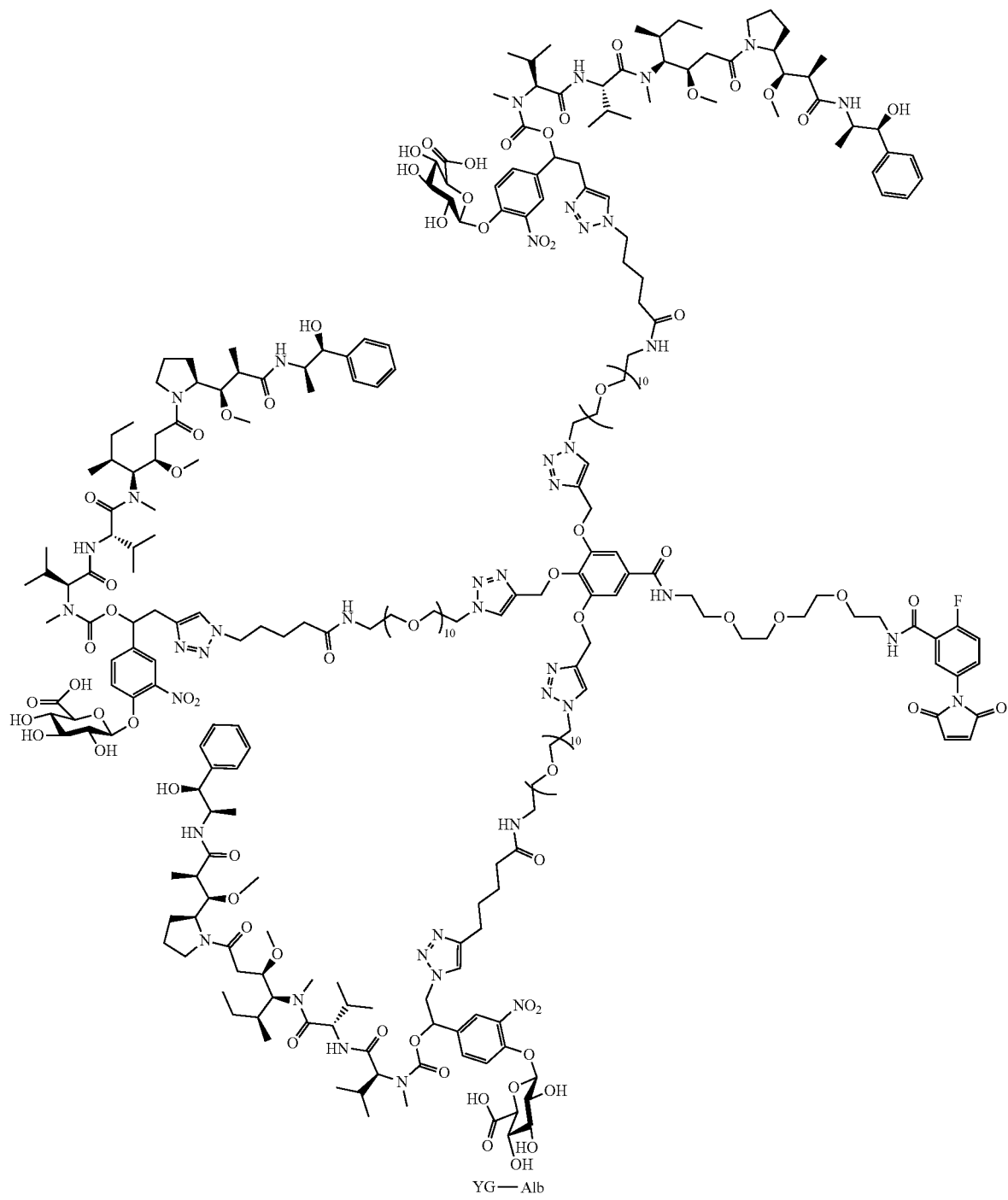

Another preferred compound of the invention has the following formula (XI"):
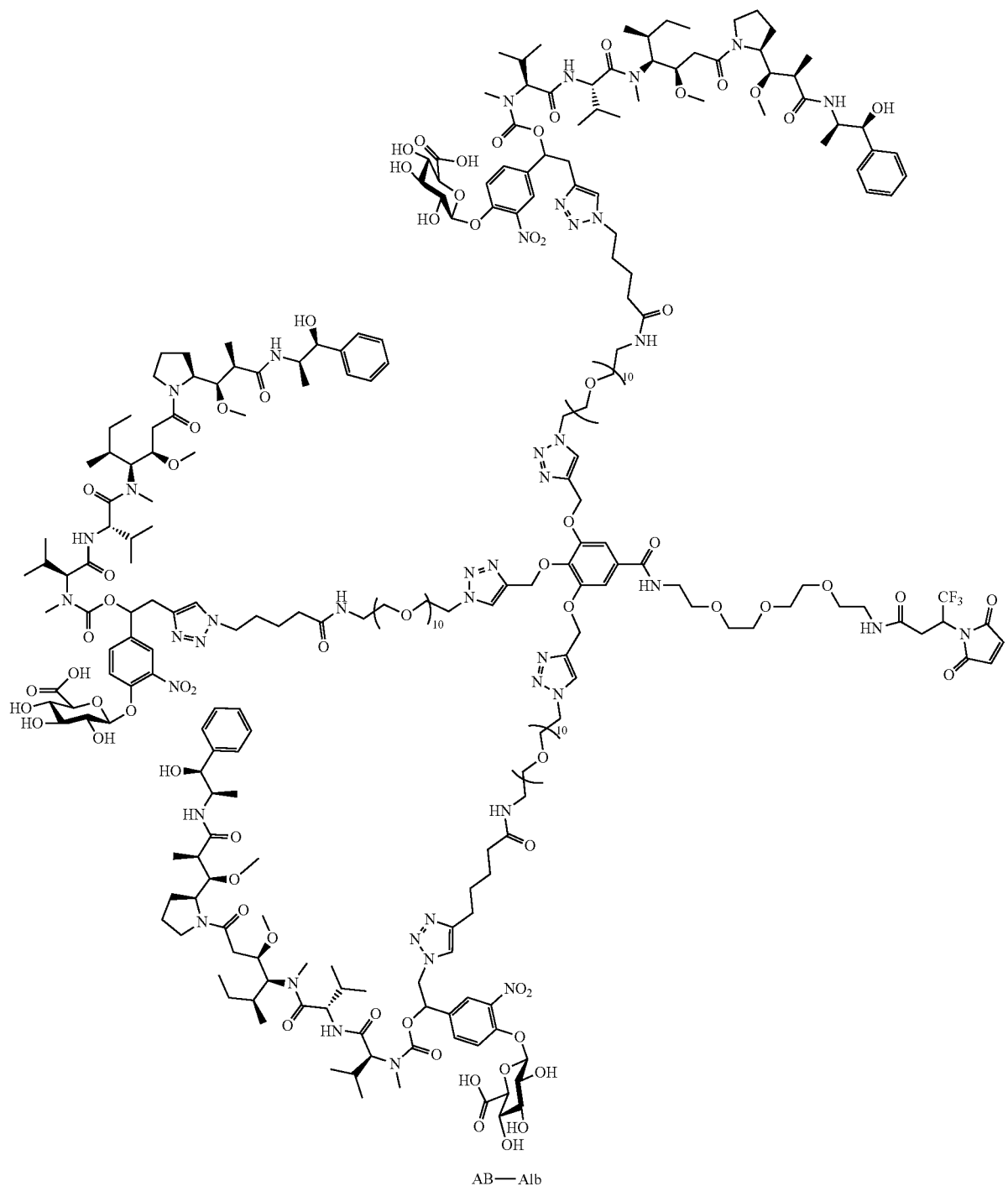

The present invention also relates to a prodrug comprising the compound of formula (I) as defined above linked through a covalent bond to albumin or a derivative or fragment thereof.

According to the invention, the term "prodrug" refers to a molecule capable of transporting, in inactivated form, an anticancer agent (A) within an organism, and of releasing said compound in an organ, a tissue or cells which is (are) specifically targeted, under the action of a R-glucuronidase.

More specifically, such a prodrug advantageously corresponds to general formula (XII) below:

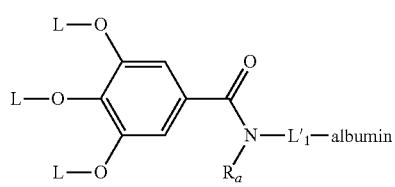

wherein L and $R_a$ are as defined above.

The $L'_1$ unit, for its part, derives from the reaction between, on the one hand, the L' radical comprising a unit capable of reacting with a free amino, hydroxyl or thiol function and in particular with a free thiol function carried by a macromolecule, advantageously an albumin molecule, even more advantageously serum albumin.

Within the present application, the prodrug may be formed in vivo or in vitro with a macromolecule, preferably with an albumin molecule.

Thus, an endogenous or exogenous albumin, and in particular a human serum albumin, a recombinant albumin or else a fragment of an albumin, may be envisaged.

According to an embodiment, the covalent bonding between a molecule of the conjugate, as described by the present invention, and a molecule of endogenous albumin, in particular a molecule of human serum albumin, or a derivative thereof, is carried out in vivo.

In one embodiment, a prodrug according to the invention comprises at least one molecule of conjugate according to the invention linked via a thioether bond to the sulfur of the cysteine in position 34 of a molecule of endogenous albumin.

It has in fact been shown that a covalent bond establishes spontaneously in vivo, for example, between, on the one hand, a compound carrying a radical capable of reacting with a thiol function and the thiol function of the cysteine in position 34 of human serum albumin (Kratz et al. 2002, J. Med. Chem.).

According to one embodiment, the invention also relates to a prodrug of formula (XII) as defined above, wherein $L'_1$-albumin has the following formula (XIII):

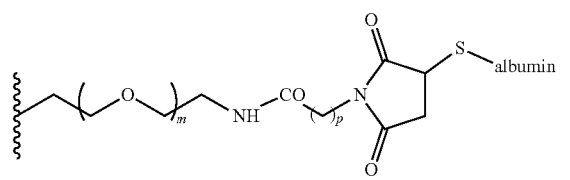

m and p being as defined above.

According to another embodiment, a prodrug according to the invention may also be formed in vitro by at least one conjugate molecule of formula (I) linked via a covalent bond to an albumin molecule, a recombinant albumin molecule or a fragment of an albumin molecule or a derivative thereof.

For the purposes of the invention, it is important that the "fragment of an albumin molecule" denotes a fragment of an albumin molecule having a size sufficient to guarantee satisfactory bioavailability, permeability with respect to tumor tissues and impermeability with respect to the endothelial barrier of healthy tissues, of the prodrug thus generated.

In this particular embodiment, the in vitro coupling between a conjugate of general formula (I), via its L' radical, and an albumin molecule, a recombinant albumin molecule or a fragment of an albumin molecule may be carried out with a free and complementary reactive function present on the albumin molecule, the recombinant albumin molecule or the fragment of an albumin molecule.

In one particular embodiment, the fragment of an albumin molecule may comprise the cysteine corresponding to the cysteine in position 34 of the endogenous albumin sequence.

Against all expectations, the coupling of a conjugate of general formula (I) and of an albumin molecule does not in any way affect the ability of the prodrug thus formed to:
  be transported and targeted specifically into the microenvironment of the tissue to be treated,
  be cleaved in the microenvironment of the tissue to be treated by a β-glucuronidase, and
  undergo, after cleavage of the glucuronyl radical, a rearrangement of the linker arm so as to release the anticancer agent.

Furthermore, the coupling between a conjugate of general formula (I), via its L' radical, and the amino, hydroxyl or thiol function of an albumin molecule, in particular an endogenous albumin molecule, does not in any way affect the ability of the anticancer agent thus released to perform its biological activity.

Finally, the coupling between a conjugate of general formula (I), via its L' radical, and the amino, hydroxyl or thiol function of an albumin molecule, in particular an endogenous albumin molecule, limits the elimination of the prodrug by the kidneys. The half-life in the blood of a prodrug according to the invention is thus increased in comparison with that of a prodrug represented by an anticancer agent functionalized with a glucuronyl radical.

In another embodiment of the invention, the albumin molecule, or albumin fragment, of the prodrug may also be modified, in particular by glycosylation or by pegylation.

The present invention also relates to the compound or conjugate of the invention as defined above and having the formula (I) as defined above, or the prodrug as defined above, for its use as a drug.

The present invention also relates to a pharmaceutical composition, comprising a compound having the formula (I) as defined above, or the prodrug as defined above, or a pharmaceutically acceptable salt thereof, and also at least one pharmaceutically acceptable excipient.

While it is possible for the compounds of the invention having formula (I) to be administered alone it is preferred to present them as pharmaceutical compositions. The pharmaceutical compositions, both for veterinary and for human use, useful according to the present invention comprise at least one compound having formula (I) as above defined, together with one or more pharmaceutically acceptable carriers and optionally other therapeutic ingredients.

In certain preferred embodiments, active ingredients necessary in combination therapy may be combined in a single pharmaceutical composition for simultaneous administration.

As used herein, the term "pharmaceutically acceptable" and grammatical variations thereof, as they refer to compositions, carriers, diluents and reagents, are used interchangeably and represent that the materials are capable of administration to or upon a mammal without the production of undesirable physiological effects such as nausea, dizziness, gastric upset and the like.

The preparation of a pharmacological composition that contains active ingredients dissolved or dispersed therein is well understood in the art and need not be limited based on formulation. Typically such compositions are prepared as injectables either as liquid solutions or suspensions; however, solid forms suitable for solution, or suspensions, in liquid prior to use can also be prepared. The preparation can also be emulsified. In particular, the pharmaceutical compositions may be formulated in solid dosage form, for example capsules, tablets, pills, powders, dragees or granules.

The choice of vehicle and the content of active substance in the vehicle are generally determined in accordance with the solubility and chemical properties of the active compound, the particular mode of administration and the provisions to be observed in pharmaceutical practice. For example, excipients such as lactose, sodium citrate, calcium carbonate, dicalcium phosphate and disintegrating agents such as starch, alginic acids and certain complex silicates combined with lubricants such as magnesium stearate, sodium lauryl sulphate and talc may be used for preparing tablets. To prepare a capsule, it is advantageous to use lactose and high molecular weight polyethylene glycols. When aqueous suspensions are used they can contain emulsifying agents or agents which facilitate suspension. Diluents such as sucrose, ethanol, polyethylene glycol, propylene glycol, glycerol and chloroform or mixtures thereof may also be used.

The compounds or conjugates of formula (I), the prodrugs or the pharmaceutical compositions according to the present invention may be administered orally, parenterally (subcutaneously, intravenously or intramuscularly) or locally by topical application to the skin and the mucous membranes.

Conjugates, prodrugs or pharmaceutical compositions in accordance with the present invention may in particular be administered alone or in combination with chemotherapy or radiotherapy or else in combination, for example, with other therapeutic agents, in particular anticancer agents and antimitotics, but also in combination with anti-inflammatory agents.

A dosage suitable for the invention may be determined according to a routine approach normally used in the art. The adjustment of said dosage is clearly part of the general competence of those skilled in the art.

It is in fact dependent, in particular, on the weight, age and sex of the individual to be treated, and on the state of progression of the disease to be treated.

The present invention also relates to the compound of formula (I) or the prodrug as defined above, for use in the treatment and/or the prevention of cancer.

In the context of the invention, the term "treating" or "treatment", as used herein, means reversing, alleviating, inhibiting the progress of, or preventing the disorder or condition to which such term applies, or one or more symptoms of such disorder or condition.

The invention also relates to a method for treating a cancer, comprising the administration of a conjugate of formula (I), of a prodrug as defined above or of a pharmaceutical composition according to the invention, in combination with another treatment chosen from a group comprising chemotherapy, radiotherapy, treatment with at least one anti-inflammatory agent, and a combination thereof According to an embodiment, the cancer is chosen from the solid cancers.

As solid cancers, the following may be mentioned: a neuroblastoma, a glioblastoma, an osteosarcoma, a retinoblastoma, a soft tissue sarcoma, cancer of the central nervous system, a nephroblastoma, lung cancer, breast cancer, prostate cancer, colorectal cancer, thyroid cancer, cervical cancer, endometrial cancer, ovarian cancer, kidney cancer, liver cancer, brain cancer, testicular cancer, pancreatic cancer, bone cancer, skin cancer, cancer of the small intestine, stomach cancer, pleural cancer, esophageal cancer, cancer of the larynx and bladder cancer.

In one particular embodiment, the solid cancer is chosen from a group comprising pancreatic cancer, lung cancer and breast cancer, and preferably pancreatic cancer.

FIGURES

FIG. 1. MIA PaCa2 tumour growth inhibition under therapy with vehicle and RC-Alb (compound of the invention of formula (XI))(4.32 and 6.48 mg·kg$^{-1}$). Injections were carried out at days 37, 44, 50 and 64.

The full line curve with black circles corresponds to the vehicle, the dotted line curve with white circles corresponds to RC-Alb at 4.32 mg·kg$^{-1}$ and the dotted line curve with black circles corresponds to RC-Alb at 6.48 mg·kg$^{-1}$.

Figure 2:
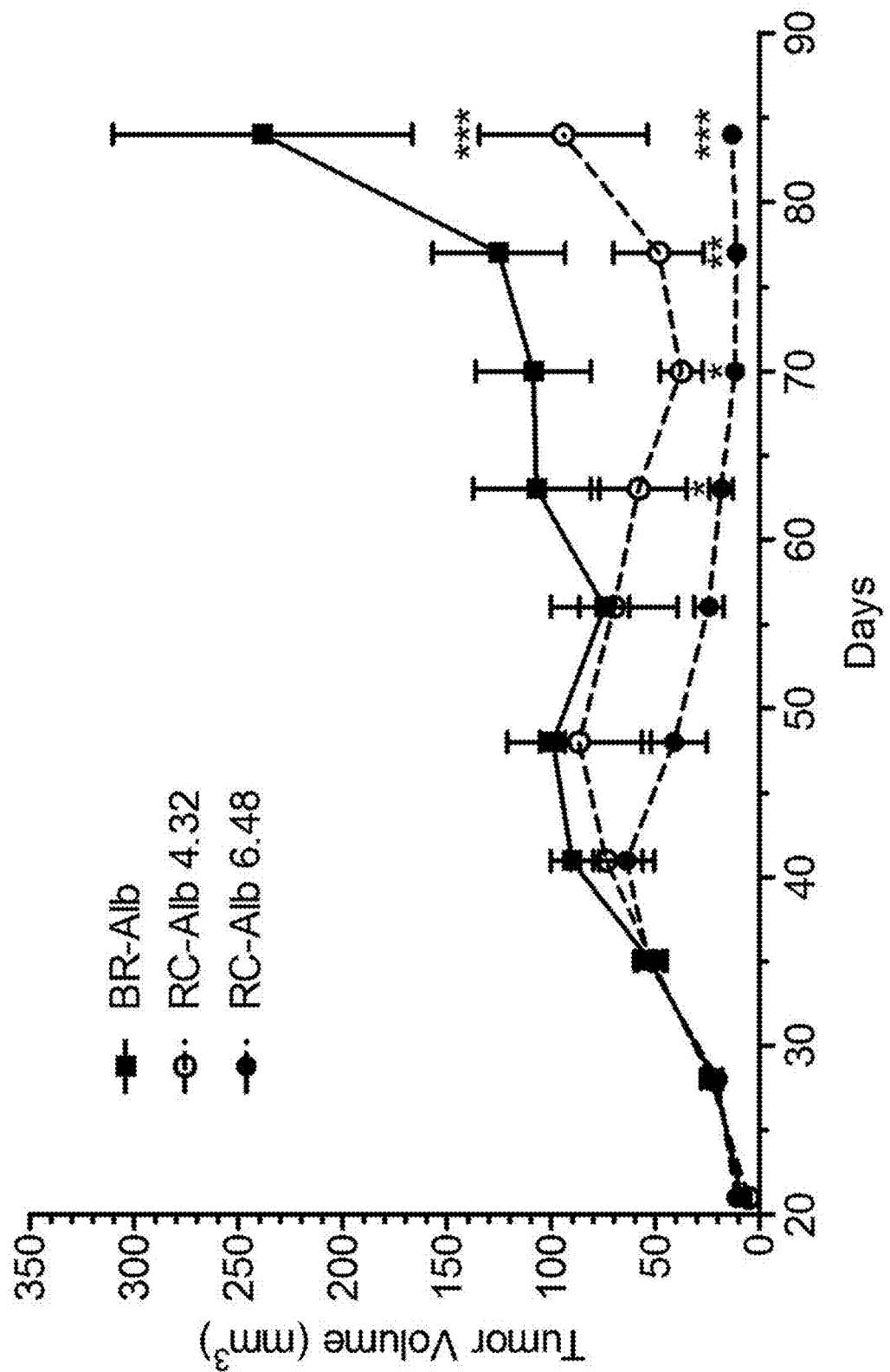

FIG. 2. MIA PaCa2 tumour growth inhibition under therapy with Br-Alb (2 mg·kg$^{-1}$, 1.1×10$^{-6}$ mol·kg$^{-1}$), RC-Alb (4.32 mg·kg$^{-1}$, 0.7×10$^{-6}$ mol·kg$^{-1}$) and RC-Alb (6.48 mg·kg$^{-1}$, 1.1×10$^{-6}$ mol·kg$^{-1}$). Injections were carried out at days 37, 44, 50 and 64.

The full line curve with black squares corresponds to BR-Alb, the dotted line curve with white circles corresponds to RC-Alb at 4.32 mg·kg$^{-1}$ and the dotted line curve with black circles corresponds to RC-Alb at 6.48 mg·kg$^{-1}$.

Figure 3:
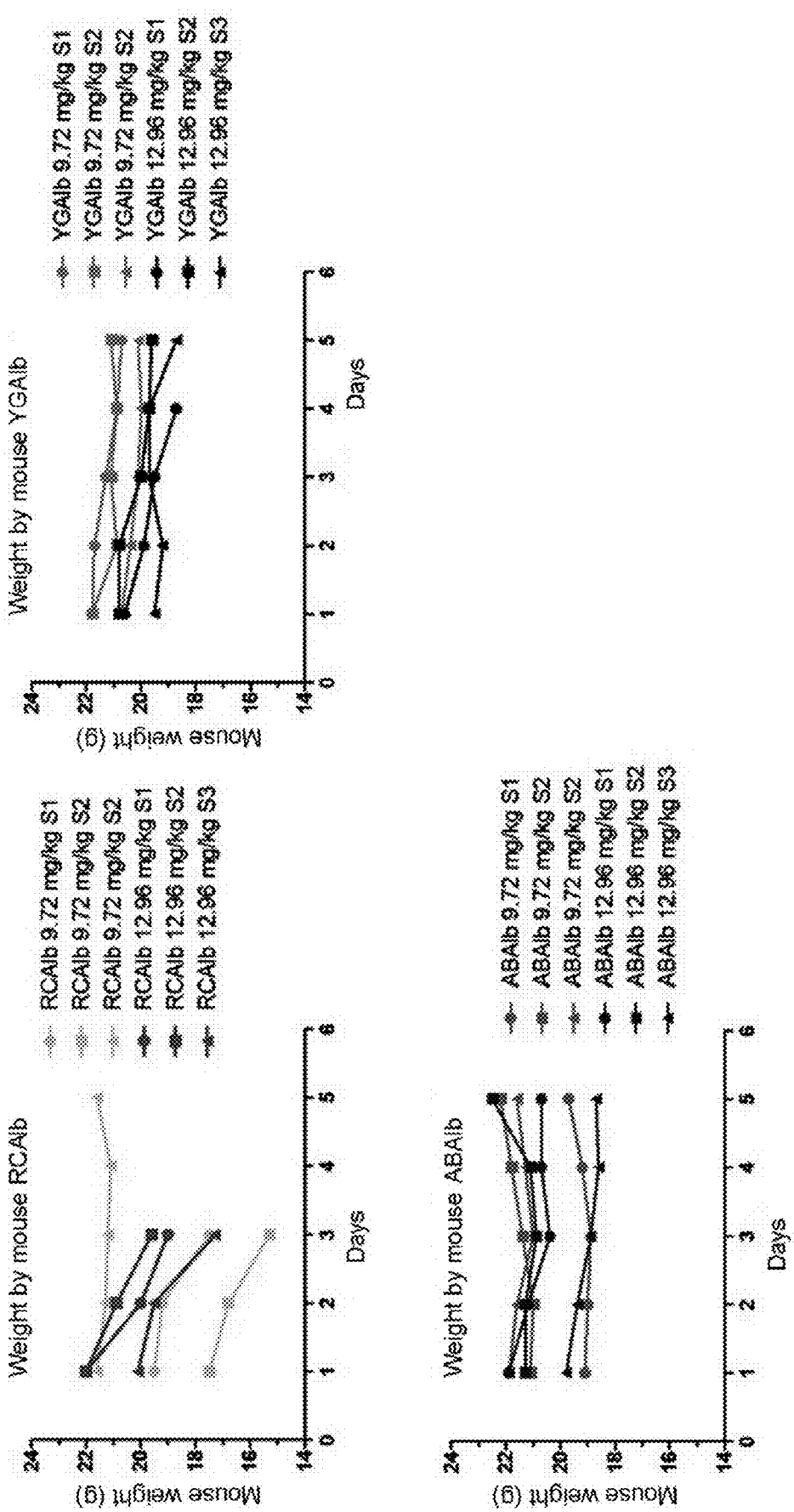

FIG. 3. Body weights of mice treated with a single i.v. injection of RC-Alb, YG-Alb and AB-Alb at 9.72 mg/kg or 12.96 mg/kg.

Figure 4:
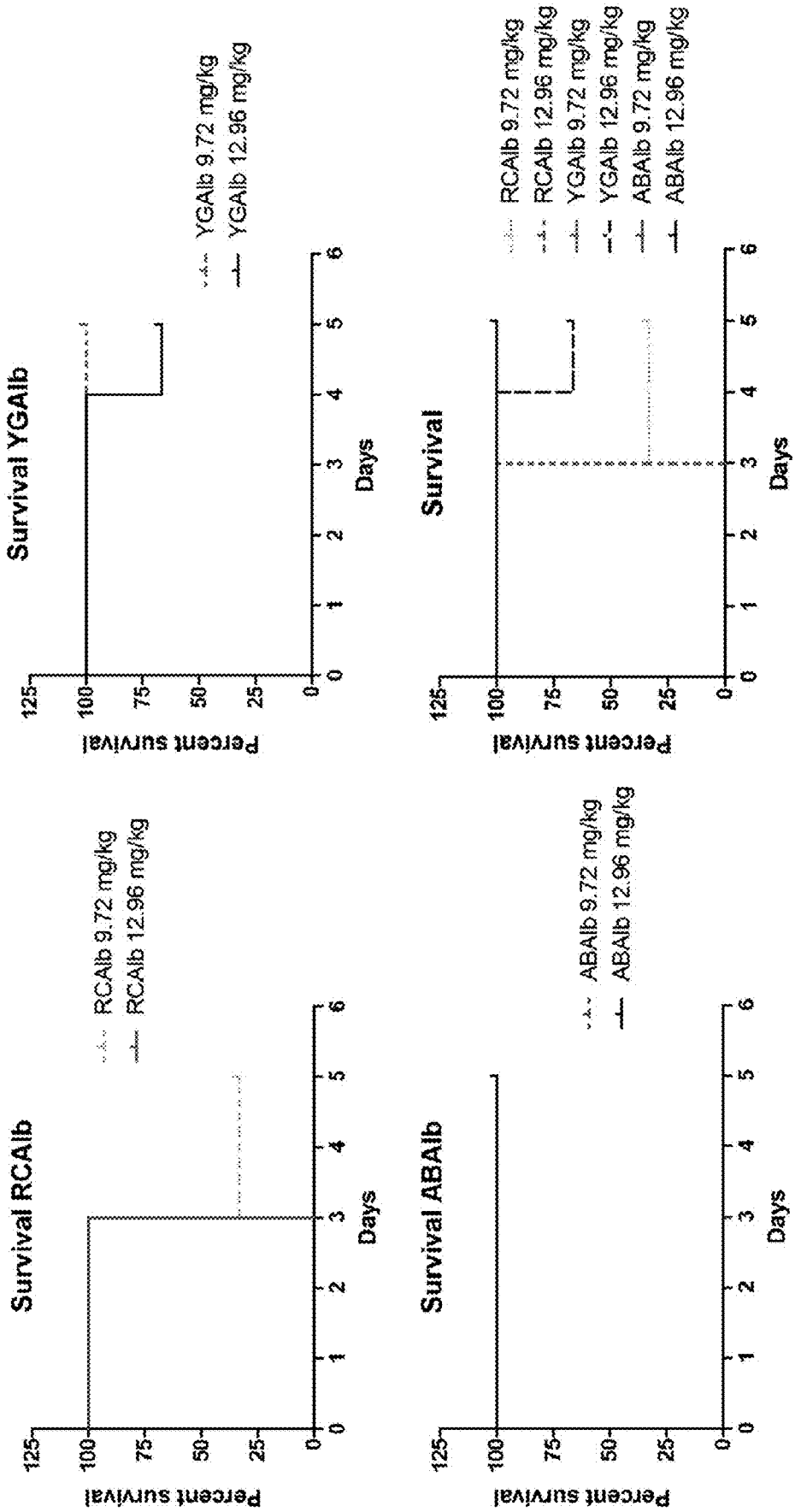

FIG. 4. Survival curve representing the percent survival as a function of time in days.

EXAMPLES

Chemistry

General Experimental Methods

All reactions were performed under an argon atmosphere. Unless otherwise stated, solvents used were of HPLC quality. Chemicals were of analytical grade from commercial sources and were used without further purification. The reaction progress was monitored on precoated silica gel TLC plates MACHEREY-NAGEL ALUGRAM® SIL G/UV254. (0.2 mm silica gel 60). Spots were visualized under 254 nm UV light and/or by dipping the TLC plate into a solution of phosphomolybdic acid (3 g) in ethanol (100 mL) followed by heating with a heat gun.

Automatic chromatographies were performed with a COMBIFLASH® RF 2001 TELEDYNE ISCO instrument equipped with UV and ESLD detector and using flash cartridges Interchim® silica 15 or 50 µm for normal phase chromatography and HP C18 RediSep® GOLD 4 g or 15.5 g for reverse phase chromatography.

$^1$H, $^{19}$F and $^{13}$C NMR spectra were respectively recorded at 400 MHz, 376 MHz and 100 MHz on a Bruker 400 Avance III instrument, equipped with an ultra-shielded magnet and a BBFO 5 mm broadband probe. Chemical shifts (δ) are reported in parts per million (ppm) from low to high field and referenced to residual solvent. Coupling constants (J) are reported in hertz (Hz).

Accurate mass was determined for all derivatives through their infusion on high resolution ESI mass spectrometers in the CBM/ICOA FR2708, at the University of Orleans and in the Organic Analysis Center of IC2MP at University of Poitiers.

Analytical RP-HPLC was carried out on a Dionex Ultimate 3000 system equipped with a UV/Visible variable wavelength detector and with a reverse-phase column chromatography MACHEREY-NAGEL NUCLEOSHELL® (150/4.6, RP18, 5 μm) at 30° C. and 1 mL·min$^{-1}$.

Method 1 used a linear gradient composed of A (0.2% TFA in water) and B (CH$_3$CN) beginning with A/B=80/20 v/v and reaching A/B=0/100 v/v within 30 min. All chromatograms were recorded at 254 nm.

SYNTHETIC STRATEGY FOR ACCESSING TO RC-Alb

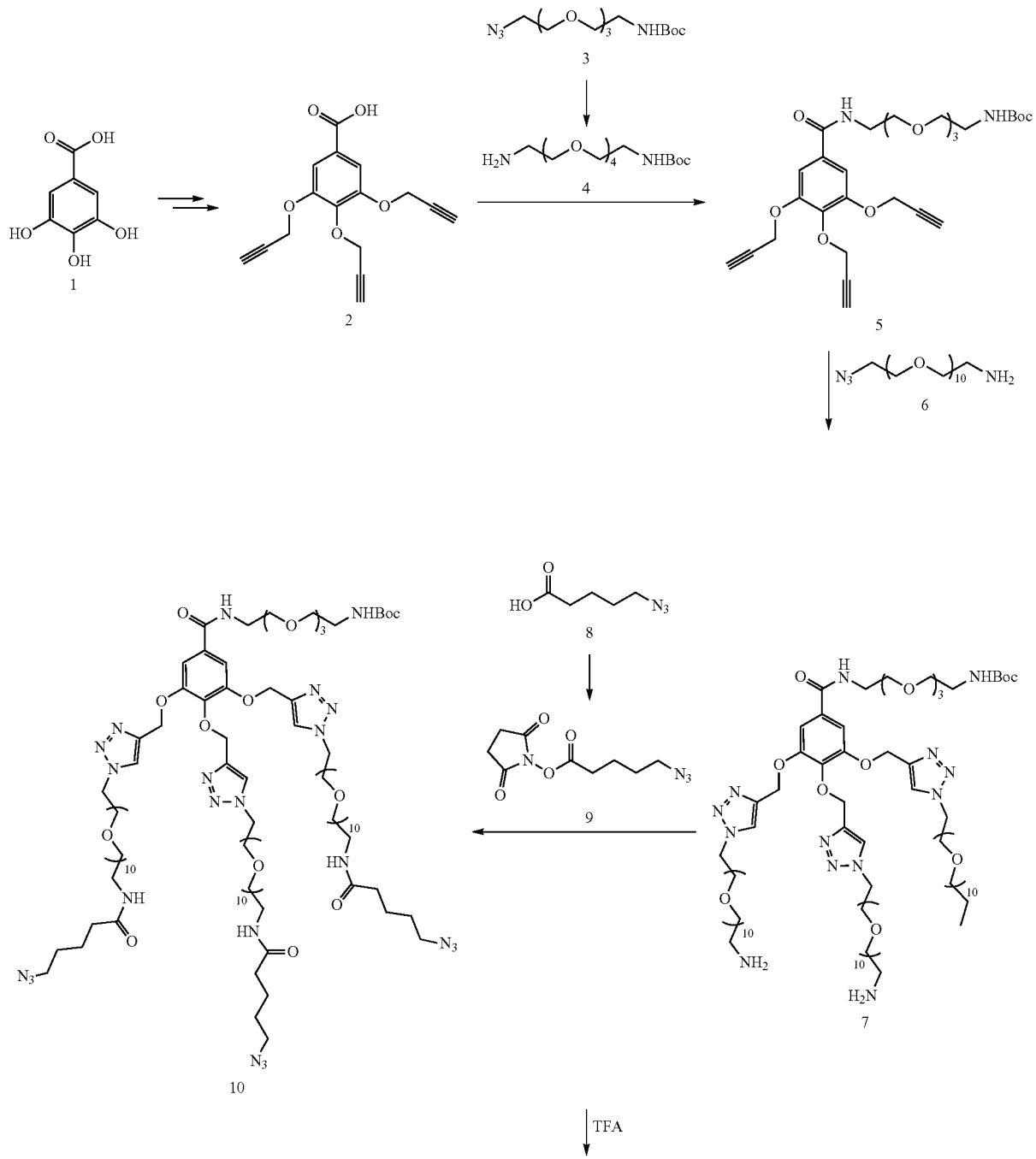

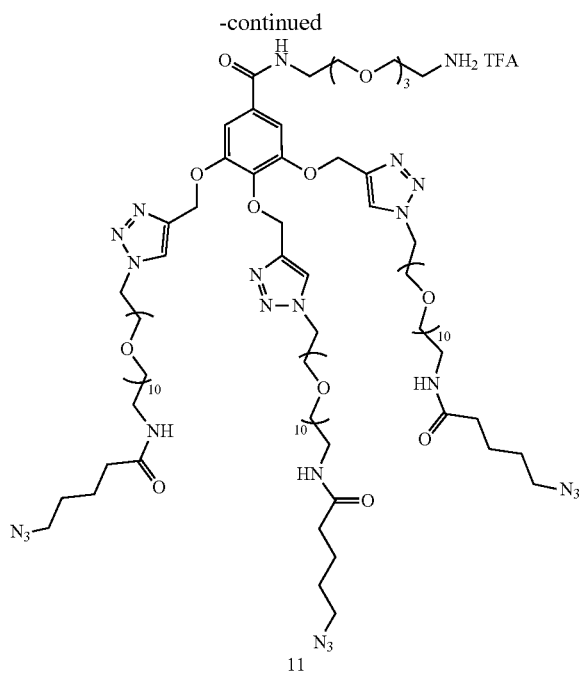
-continued
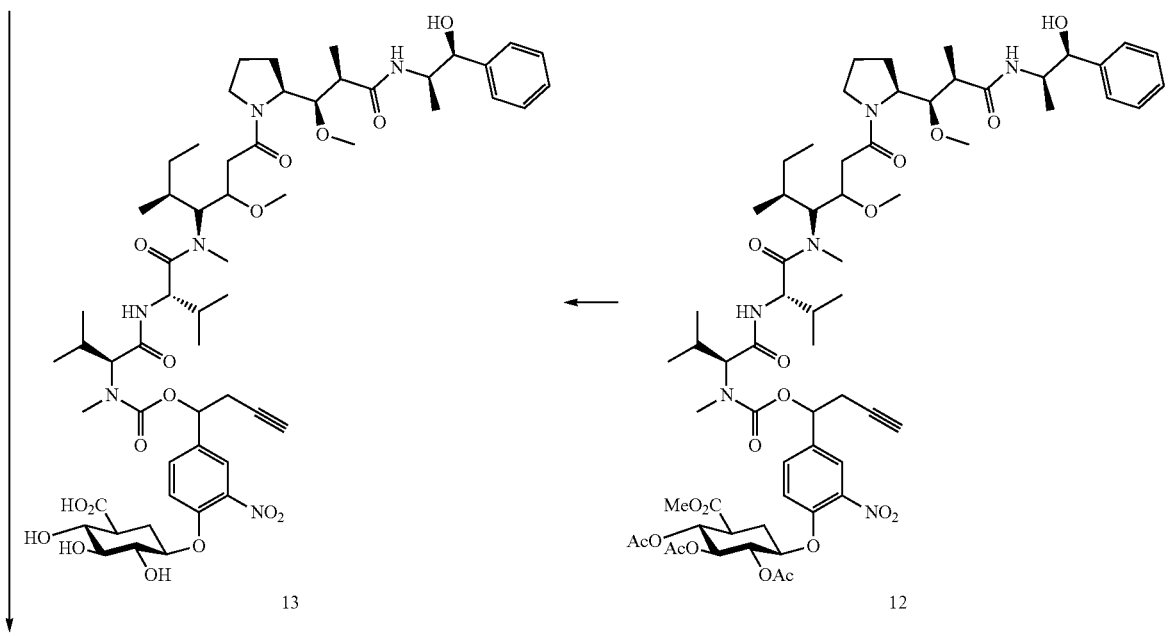

-continued
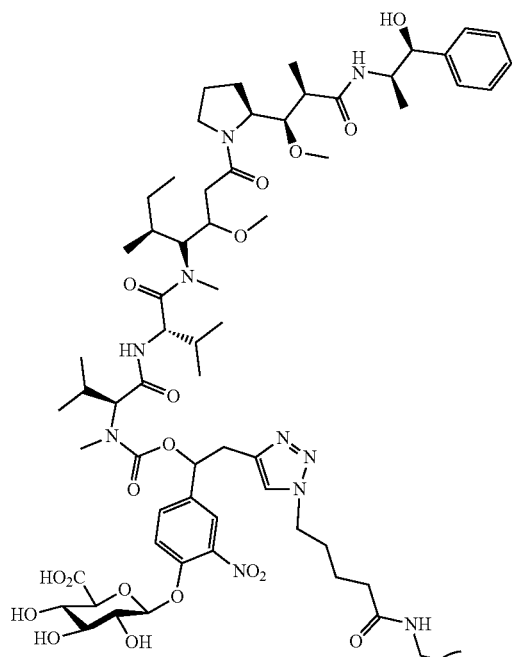
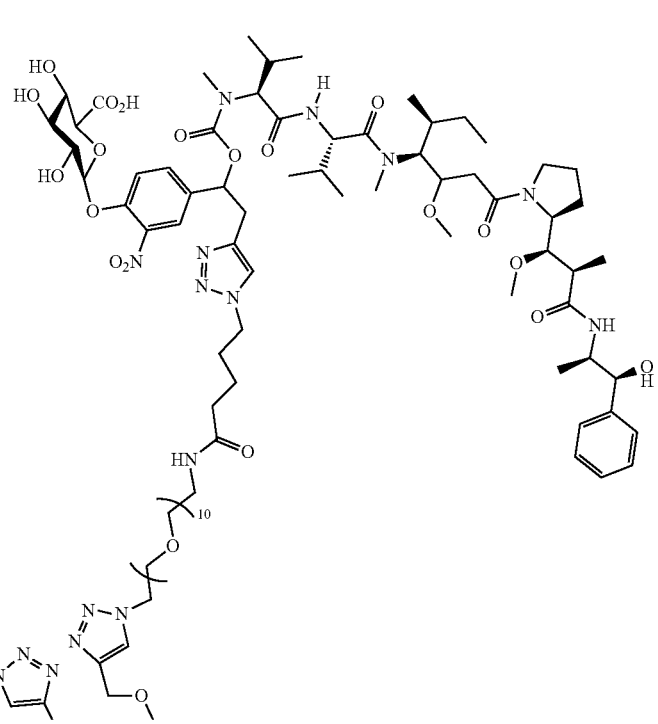
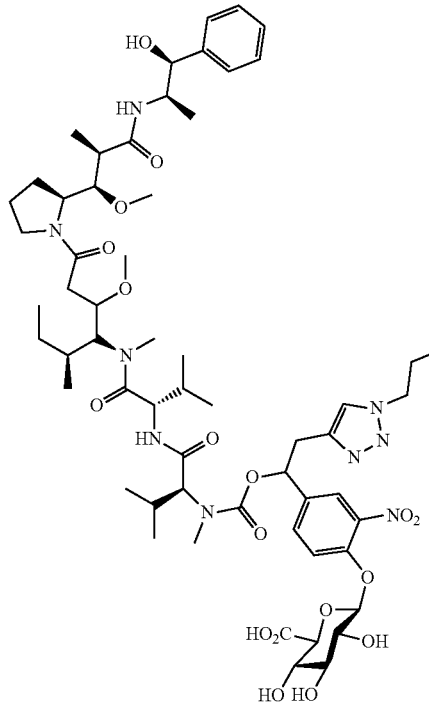
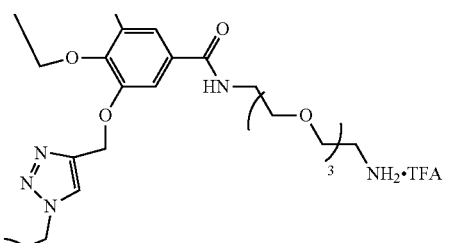

25 26
-continued
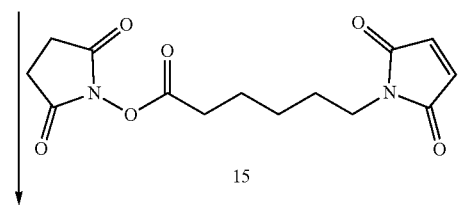
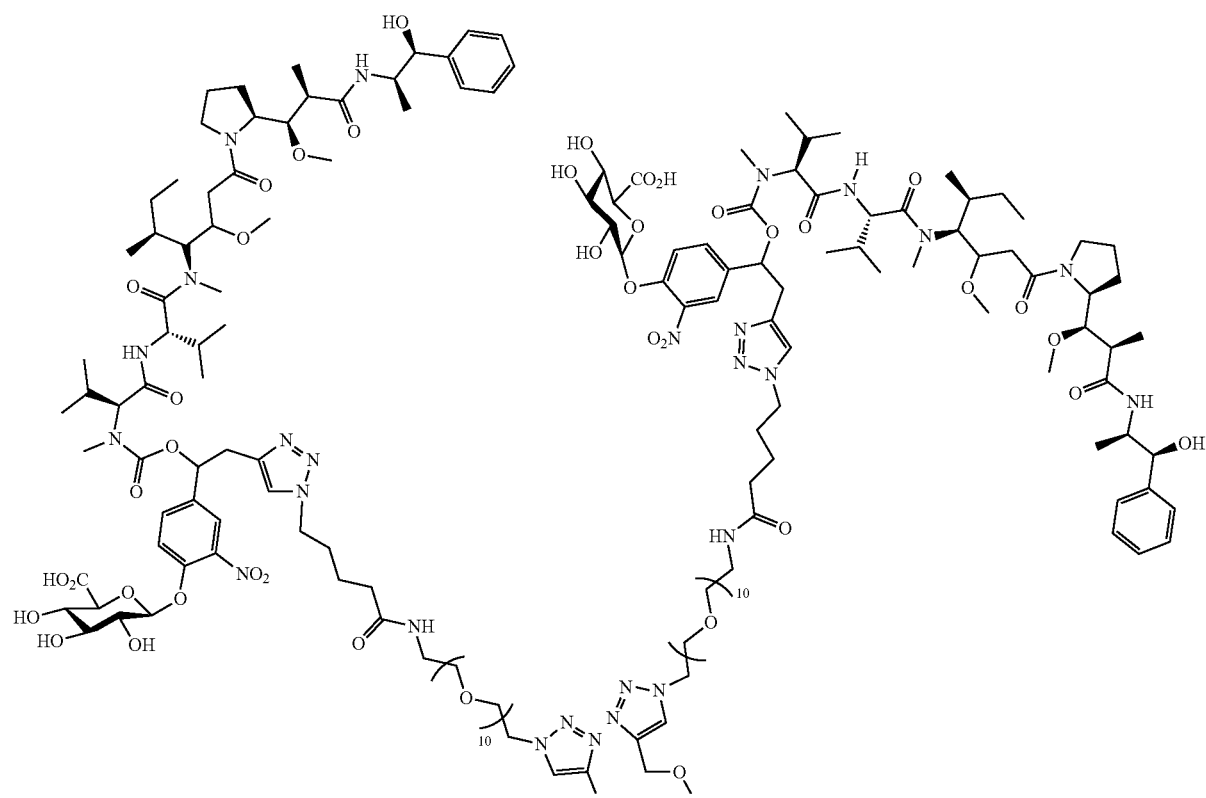

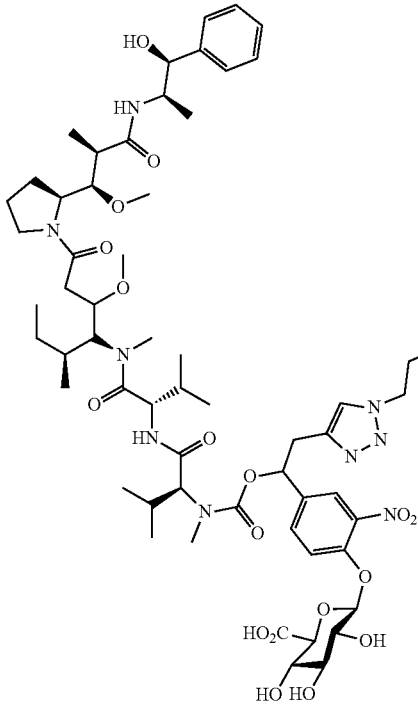
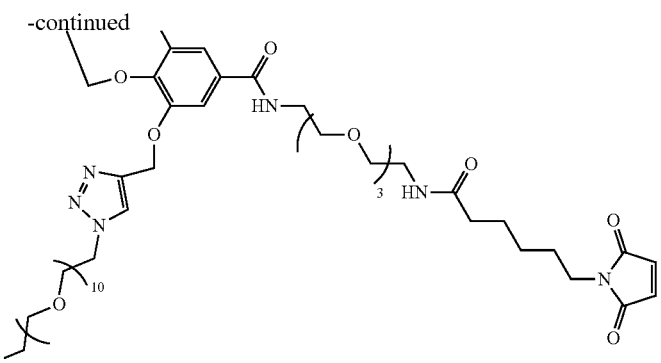

RC-Alb

1. Synthesis of Compound 5

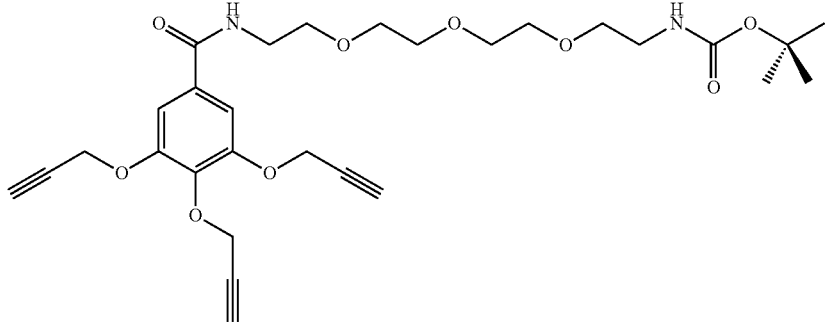

Azide Reduction

PPh$_3$ (730 mg, 2.78 mmol, 1.5 equiv.) was added to a solution of azide 3 (590 mg, 1.85 mmol, 1 equiv.) in THF (8 mL). The mixture was stirred for 20 hours at room temperature and 5 hours at 50° C. After completion, the mixture was cooled to room temperature then water (2.5 mL) was added and the mixture was stirred for 18 hours. The solvent was removed under reduced pressure and the crude amine 4 was used in the next step without further purification.

Amide Formation

To a cooled solution (0° C.) of carboxylic acid 2 (Haibin Gu, *Polymer*, 2018, 146, 275-290)(455 mg, 1.60 mmol, 1 equiv.) and crude amine 4 (1.85 mmol, 1.15 equiv.) in dry CH$_2$Cl$_2$ (8 mL) were added DMAP (215 mg, 1.76 mmol, 1.1 equiv.) and EDC.HCl (337 mg, 1.76 mmol, 1.1 equiv.). The mixture was stirred for 60 hours at room temperature and diluted with CH$_2$Cl$_2$ (40 mL). The organic layer was washed with 1M HCl (40 mL). The aqueous layer was extracted with CH$_2$Cl$_2$ (3×40 mL). The combined organic layers were dried with MgSO$_4$ and concentrated. The crude residue was purified by chromatography on a silica gel column (gradient elution CH$_2$Cl$_2$/Acetone 95/5 to 80/20) to give compound 5 (1.68 g, 86%) as a white solid.

R$_f$: 0.65 (CH$_2$Cl$_2$/MeOH 95/5)

$^1$H NMR (400 MHz, CDCl$_3$) δ=7.23 (s, 2H), 6.76 (bs, 1H), 5.00 (s, 1H), 4.81 (d, J=2.3 Hz, 4H), 4.79 (d, J=2.4 Hz, 2H), 3.83-3.54 (m, 12H), 3.49 (t, J=5.1 Hz, 2H), 3.26 (m, 2H), 2.56 (t, J=2.2 Hz, 2H), 2.46 (t, J=2.4 Hz, 1H), 1.45 (s, 9H).

$^{13}$C NMR (100 MHz, CDCl$_3$) δ=166.79, 156.13, 151.58, 140.06, 130.70, 108.20, 79.44, 78.92, 78.29, 77.36, 76.42, 75.68, 70.67, 70.60, 70.45, 70.36, 70.28, 70.04, 60.46, 57.43, 40.12, 28.55.

HRMS (ESI+): [M+Na]$^+$ calcd for C$_{29}$H$_{38}$N$_2$NaO$_9$: 581.2470 measured 581.2487; [2M+Na]$^+$ calcd for C$_{58}$H$_{76}$N$_4$NaO$_{18}$: 1139.5047 measured 1139.5085.

2. Synthesis of Compound 7
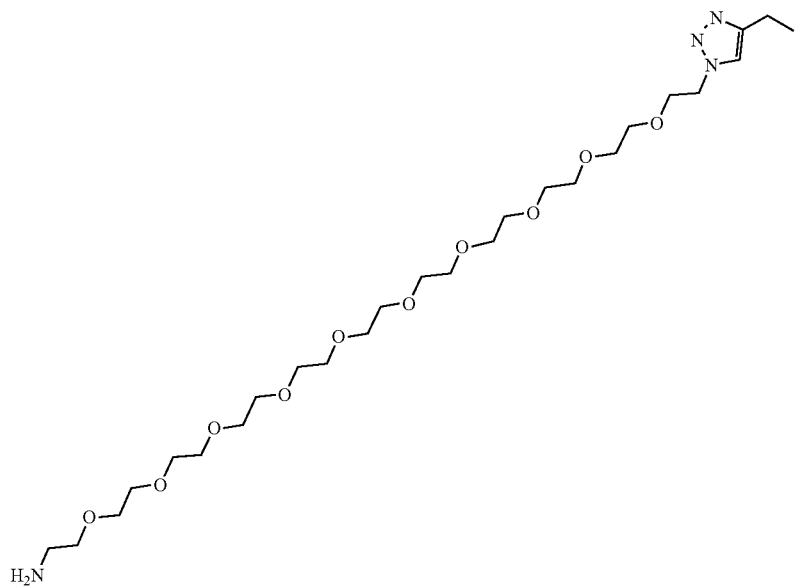
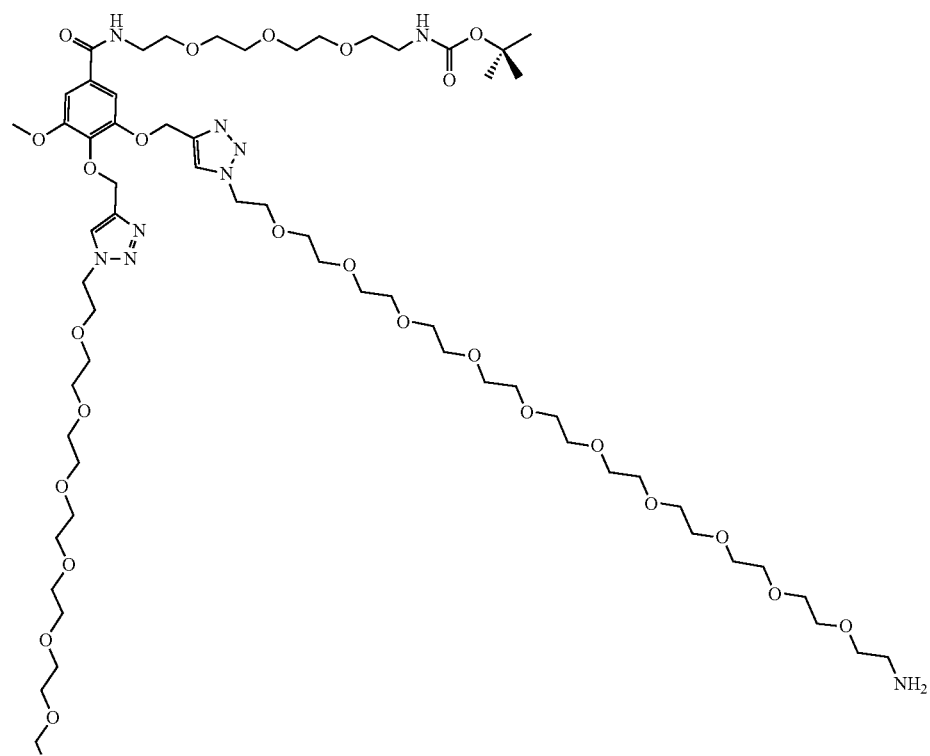

Cu(MeCN)₄PF₆ (7.0 mg, 0.019 mmol, 0.12 equiv.) was added to a solution of alkyne 5 (89 mg, 0.159 mmol, 1 equiv.) and azido-PEG10-amine 6 (285 mg, 0.541 mmol, 3.4 equiv.) in dry and degassed $CH_2Cl_2$ (2 mL). The mixture was stirred for 2 hours at room temperature. After completion, the resin QuadraPure® IDA (200 mg) was added to the mixture, stirred for additional 2 hours and removed by filtration. The solvent was evaporated under reduced pressure and the crude was purified by reverse phase chromatography on $C_{18}$ grafted silica (gradient elution $MeCN/H_2O$ 10/90 to 50/50 over 30 minutes) to afford compound 7 (203 mg, 60%) as a colorless oil.

$R_t$: 5.72 min (Method 1)

¹H NMR (400 MHz, MeOD) δ=8.21 (s, 2H), 7.94 (s, 1H), 7.39 (s, 2H), 5.26 (s, 4H), 5.14 (s, 2H), 4.63 (t, J=5.0 Hz, 4H), 4.54 (t, J=5.0 Hz, 2H), 3.93 (t, J=5.0 Hz, 4H), 3.85 (t, J=5.0 Hz, 2H), 3.73-3.50 (m, 126H), 3.47 (t, J=5.6 Hz, 3H), 3.19 (t, J=5.6 Hz, 2H), 2.87 (t, J=5.1 Hz, 6H), 1.42 (s, 9H).

¹³C NMR (100 MHz, MeOD) δ=168.99, 158.38, 153.54, 145.22, 144.46, 141.53, 131.30, 126.57, 126.53, 108.48, 80.03, 72.09, 71.53, 71.48, 71.44, 71.23, 71.12, 70.64, 70.34, 66.97, 63.77, 51.50, 51.38, 41.75, 41.25, 41.19, 28.80.

HRMS (ESI+): [M+2H]²⁺ calcd for $C_{95}H_{178}N_{14}O_{39}$: 1069.6182 measured 1069.6170; [M+3H]³⁺ calcd for $C_{95}H_{179}N_{14}O_{39}$: 713.4145 measured 713.4138; [M+4H]⁴⁺ calcd for $C_{95}H_{180}N_{14}O_{39}$: 535.3127 measured 535.3125.

3. Synthesis of Compound 9

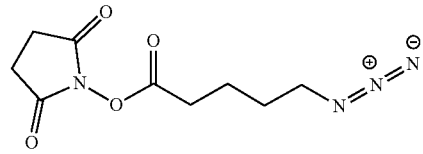 [SMILES: [N-]=[N+]=NCCCCC(=O)ON1C(=O)CCC1=O]

EDC.HCl (134 mg, 0.7 mmol, 1 equiv.) was added to a solution of carboxylic acid 8 (100 mg, 0.7 mmol, 1 equiv.) and N-hydroxysuccinimide (80 mg, 0.7 mmol, 1 equiv.) in dry $CH_2Cl_2$ (4.6 mL). The mixture was stirred for 60 hours at room temperature. After completion the mixture was diluted with $CH_2Cl_2$ (10 mL). The organic layer was washed with water (10 mL) then with brine (10 mL), dried with $MgSO_4$ and concentrated under vacuo. The crude residue was purified by chromatography on a silica gel column (gradient elution $CH_2Cl_2$/MeOH 100/0 to 99/1) to give compound 9 (135 mg, 80%) as a translucent yellowish oil.

$R_f$: 033 (PE/AcOEt 70/30)

¹H NMR (400 MHz, CD₂Cl₂) δ=3.29 (t, J=6.6 Hz, 2H), 2.78 (s, 4H), 2.61 (t, J=7.2 Hz, 2H), 1.83-1.57 (m, 4H).

¹³C NMR (400 MHz, CD₂Cl₂) δ=169.24, 168.21, 50.73, 30.32, 27.78, 25.53, 21.75.

HRMS (ESI+): [M+H]⁺ calcd for $C_9H_{13}N_4O_4$: 241.0931 measured 241.0936; [M+Na]⁺ calcd for $C_9H_{12}N_4NaO_4$: 263.0751 measured 263.0756; [2M+Na]⁺ calcd for $C_{18}H_{24}N_8NaO_8$: 503.1609 measured 503.1618.

4. Synthesis of Compound 10
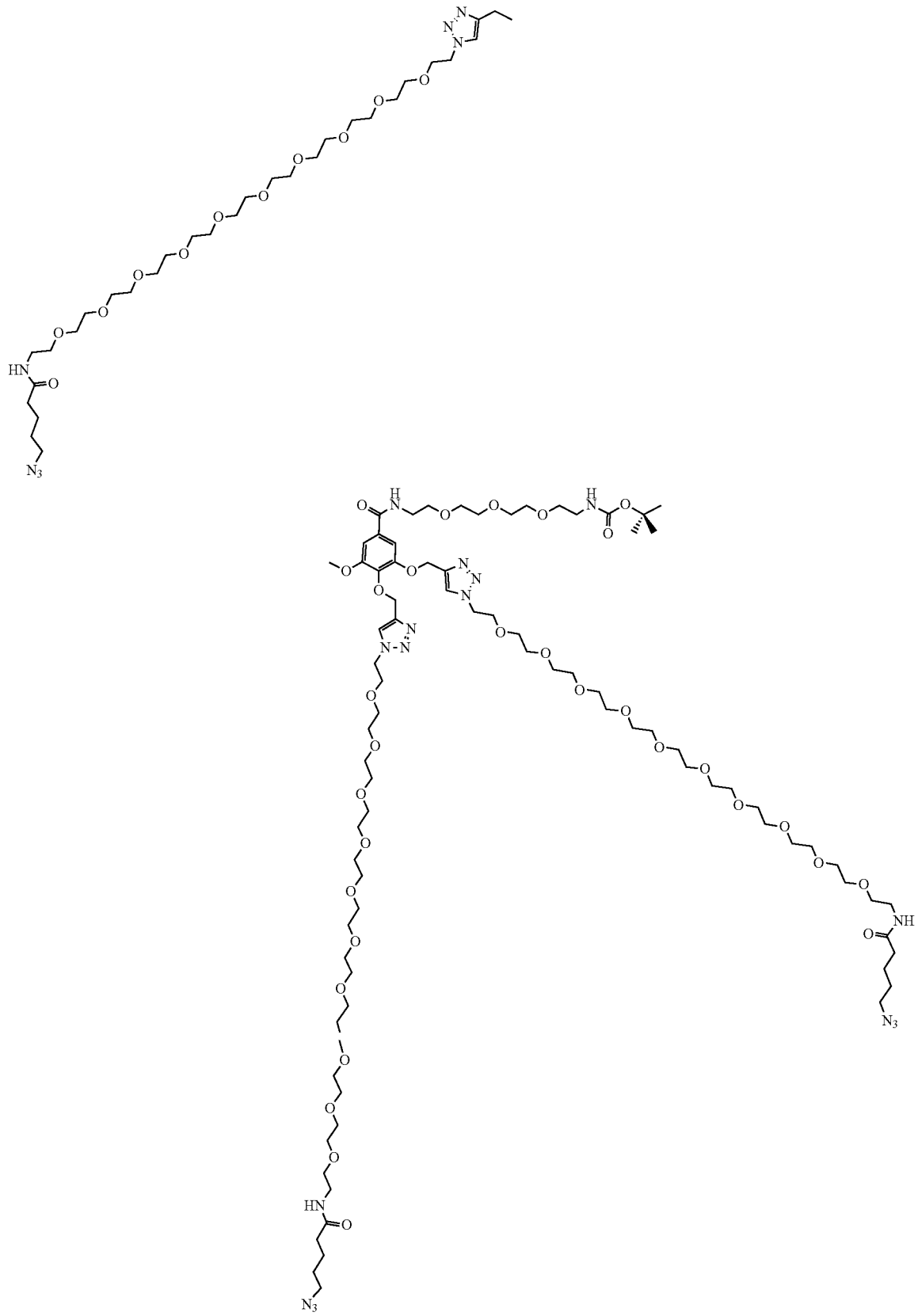

Et₃N (13.7 µL, 0.098 mmol, 3.5 equiv.) was added to a solution of triamine 7 (60 mg, 0.028 mmol, 1 equiv.) and NHS ester 9 (23.6 mg, 0.098 mmol, 3.5 equiv.) in dry DMF (1 mL). The mixture was stirred at room temperature for 4 hours. After completion, the solvent was removed under reduced pressure and the crude residue was purified by chromatography on a silica gel column (gradient elution $CH_2Cl_2$/MeOH 95/5 to 75/25) to afford compound 10 (54.8 mg, 78%) as a colorless oil.

$R_t$: 11.00 min (Method 1)

$^1$H NMR (400 MHz, $CD_2Cl_2$) δ=7.97 (s, 2H), 7.84 (s, 1H), 7.28 (s, 2H), 7.15 (bs, 1H), 6.32 (bs, 3H), 5.22 (s, 4H), 5.13 (s, 2H), 4.55 (t, J=5.1 Hz, 4H), 4.49 (t, J=5.2 Hz, 2H), 3.88 (t, J=5.1 Hz, 4H), 3.84 (t, J=5.3 Hz, 2H), 3.64-3.49 (m, 126H), 3.47-3.43 (m, 2H), 3.37 (m, 6H), 3.27 (t, J=6.6 Hz, 6H), 3.21 (m, 2H), 2.60 (s, 1H), 2.17 (t, J=7.1 Hz, 6H), 1.73-1.53 (m, 12H), 1.39 (s, 9H).

$^{13}$C NMR (400 MHz, $CD_2Cl_2$) δ=172.65, 166.88, 156.34, 152.62, 144.47, 143.71, 140.52, 130.84, 125.18, 125.01, 107.46, 79.23, 71.35, 71.00, 70.95, 70.89, 70.84, 70.79, 70.71, 70.67, 70.55, 70.32, 69.88, 69.81, 66.70, 63.41, 51.74, 50.77, 50.54, 40.84, 40.50, 39.65, 36.12, 28.87, 28.63, 23.26.

HRMS (ESI+): [M+Na]⁺ calcd for $C_{110}H_{197}N_{23}O_{42}Na$: 2535.3879 measured 2535.3893; [M+2Na]²⁺ calcd for $C_{110}H_{197}N_{23}O_{42}Na_2$: 1279.1885 measured 1279.1877; [M+3Na]³⁺ calcd for $C_{110}H_{197}N_{23}O_{42}Na_3$: 860.4554 measured 860.4543; [M+4Na]⁴⁺ calcd for $C_{110}H_{197}N_{23}O_{42}Na_4$: 651.0889 measured 651.0888.

5. Synthesis of Compound 11

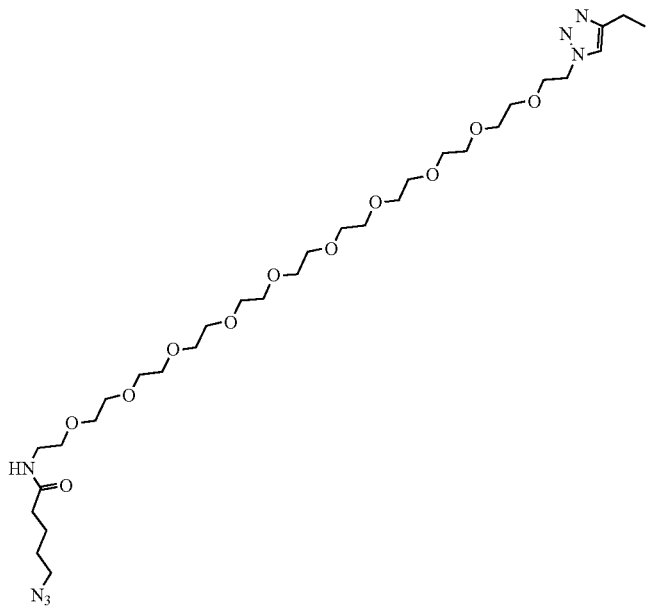

-continued
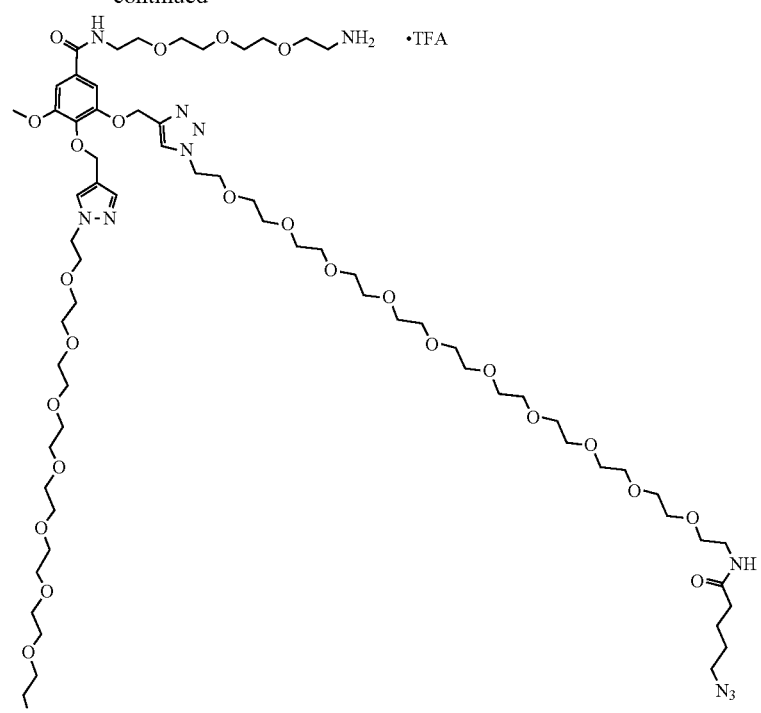
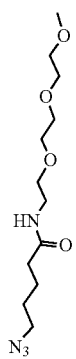

TFA (160 µL) was added to a cooled (0° C.) solution of carbamate 10 (70 mg, 0.02788 mmol, 1 equiv.) in dry CH$_2$Cl$_2$ (700 µL). The mixture was stirred at 0° C. for 30 minutes and at room temperature for additional 30 minutes. After completion, the solvent was evaporated under reduced pressure and the crude mixture was purified by reverse phase chromatography on C18 grafted silica (gradient elution MeCN/H$_2$O (0.05% TFA) 20/80 to 100/0 over 30 minutes) to give compound 11 (65.5 mg, 91%) as a colorless oil. R$_t$: 8.66 min (Method 1)

$^1$H NMR (400 MHz, CD$_2$Cl$_2$) δ=8.07 (bs, 3H), 7.99 (bs, 3H), 7.87 (s, 1H), 7.35 (s, 2H), 6.50 (bs, 3H), 5.21 (s, 4H), 5.14 (s, 2H), 4.55 (t, J=4.5 Hz, 4H), 4.52-4.42 (m, 2H), 3.88 (t, J=4.6 Hz, 4H), 3.86-3.80 (m, J=4.9 Hz, 2H), 3.71 (s, 4H), 3.69-3.45 (m, 131H), 3.44-3.33 (m, J=4.5 Hz, 6H), 3.27 (t, J=6.2 Hz, 6H), 3.14 (s, 3H), 2.18 (t, J=7.0 Hz, 6H), 1.78-1.43 (m, 12H).

$^{13}$C NMR (400 MHz, CD$_2$Cl$_2$) δ=172.89, 167.28, 152.54, 144.38, 143.77, 140.32, 130.68, 125.39, 125.19, 107.65, 71.00, 70.92, 70.83, 70.81, 70.69, 70.47, 70.39, 69.85, 69.79, 67.40, 66.41, 63.19, 51.76, 50.85, 50.62, 40.47, 40.25, 39.67, 36.12, 28.89, 23.30.

HRMS (ESI+): [M+H]$^+$ calcd for C$_{105}$H$_{189}$N$_{23}$O$_{40}$H: 2413.3535 found 2413.3482; [M+2Na]$^{2+}$ calcd for C$_{105}$H$_{189}$N$_{23}$O$_{40}$Na$_2$: 1229.1623 found 1229.1575; [M+2H]$^{2+}$ calcd for C$_{105}$H$_{189}$N$_{23}$O$_{40}$H$_2$: 1207.1804 found 1207.1776; [M+H+Na]$^{2+}$ calcd for C$_{105}$H$_{189}$N$_{23}$O$_{40}$HNa: 1218.1714 found 1218.1685; [M+3H]$^{3+}$ calcd for C$_{105}$H$_{189}$N$_{23}$O$_{40}$H$_3$: 805.1227 found 805.1186; [M+3Na]$^{3+}$ calcd for C$_{105}$H$_{189}$N$_{23}$O$_{40}$Na$_3$: 827.1046 found 827.1007; [M+H+2Na]$^{3+}$ calcd for C$_{105}$H$_{169}$N$_{23}$O$_{40}$HNa$_2$: 812.4500 found 812.4480; [M+2H+Na]$^{3+}$ calcd for C$_{105}$H$_{189}$N$_{23}$O$_{40}$H$_2$Na: 819.7773 found 819.7746.

6. Synthesis of Compound 13

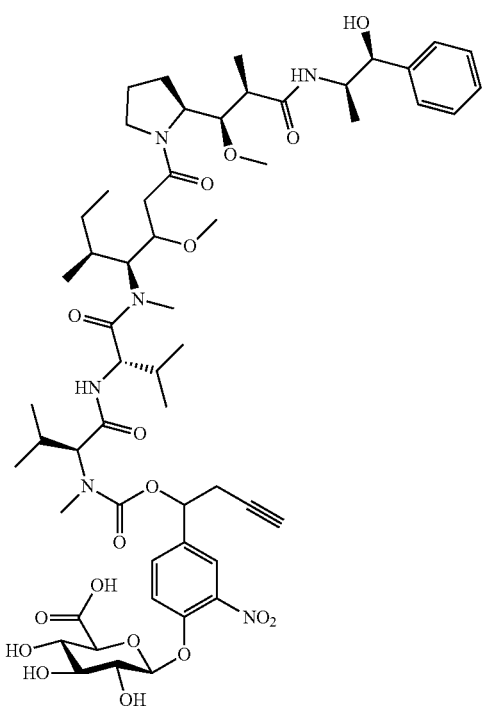

A cooled solution (0° C.) of LiOH·H$_2$O (31.6 mg, 0.75 mmol, 8.75 equiv.) in H$_2$O (6 mL) was added dropwise to a cooled solution (−5° C.) of the protected glucuronide derivative (PAPOT S. et al, *Chem. Sci.,* 2017, 8, 3427-3433) 12 (109 mg, 0.086 mmol, 1 equiv.) in MeOH (6 mL). The mixture was stirred at −5° C. until disappearance of starting material (30 min). Then hydrolysis was performed with IRC-50 acidic resin. After filtration, the solvents were removed under reduced pressure and the crude was purified by reverse phase chromatography on C18 grafted silica (gradient elution MeCN/H$_2$O (0.05% TFA) 20/80 to 80/20 over 30 minutes) to afford compound 13 (70 mg, 72%) as a white solid.

R$_t$: 11.49-11.80 min (Method 1)

$^1$H NMR (400 MHz, DMSO-d6) δ=8.59-8.27 (m, 0.5H), 8.10-8.04 (m, 1H), 7.94-7.82 (m, 1H), 7.80-7.58 (m, 1.5H), 7.45-7.41 (m, 1H), 7.36-7.21 (m, 4H), 7.19-7.15 (m, 1H), 5.79-5.58 (m, J=29.3 Hz, 1H), 5.31-5.14 (m, 1H), 4.82-4.54 (m, 1H), 4.54-4.15 (m, 2.5H), 4.09-3.87 (m, 3H), 3.78 (d, J=9.4 Hz, 0.5H), 3.67-3.35 (m, 2A), 3.35-2.54 (m, 20H), 2.46-2.16 (m, 2H), 2.16-1.92 (m, 3H), 1.88-1.64 (m, 3H), 1.61-1.40 (m, 2H), 1.31 (s, 1H), 1.09-0.95 (m, 6.5H), 0.94-0.72 (m, 16H), 0.72-0.48 (m, 3.5H).

$^{19}$F NMR (376 MHz, DMSO-d6) δ=−75.63

$^{13}$C NMR (400 MHz, DMSO-d6) δ=172.38, 172.32, 169.92, 169.86, 169.78, 169.76, 169.65, 168.74, 168.71, 158.52, 158.14, 154.56, 154.54, 154.38, 148.76, 148.68, 143.67, 139.84, 134.20, 132.63, 127.81, 127.74, 126.74, 126.66, 126.48, 126.41, 122.90, 116.19, 100.11, 85.45, 81.64, 77.68, 75.82, 75.43, 74.79, 73.36, 72.74, 71.16, 63.20, 62.88, 60.93, 60.29, 58.67, 58.17, 57.16, 54.15, 49.76, 49.17, 47.22, 46.25, 43.76, 43.21, 31.58, 30.09, 29.70, 29.49, 25.91, 25.37, 24.34, 23.12, 18.89, 18.85, 18.77, 18.60, 18.57, 18.37, 15.46, 15.28, 15.00, 10.42, 10.36, 10.32.

HRMS (ESI+): [M+Na]$^+$ calcd for C$_{56}$H$_{82}$N$_4$NaO$_{18}$: 1149.5578 found 1149.5635.

7. Synthesis of Compound 14

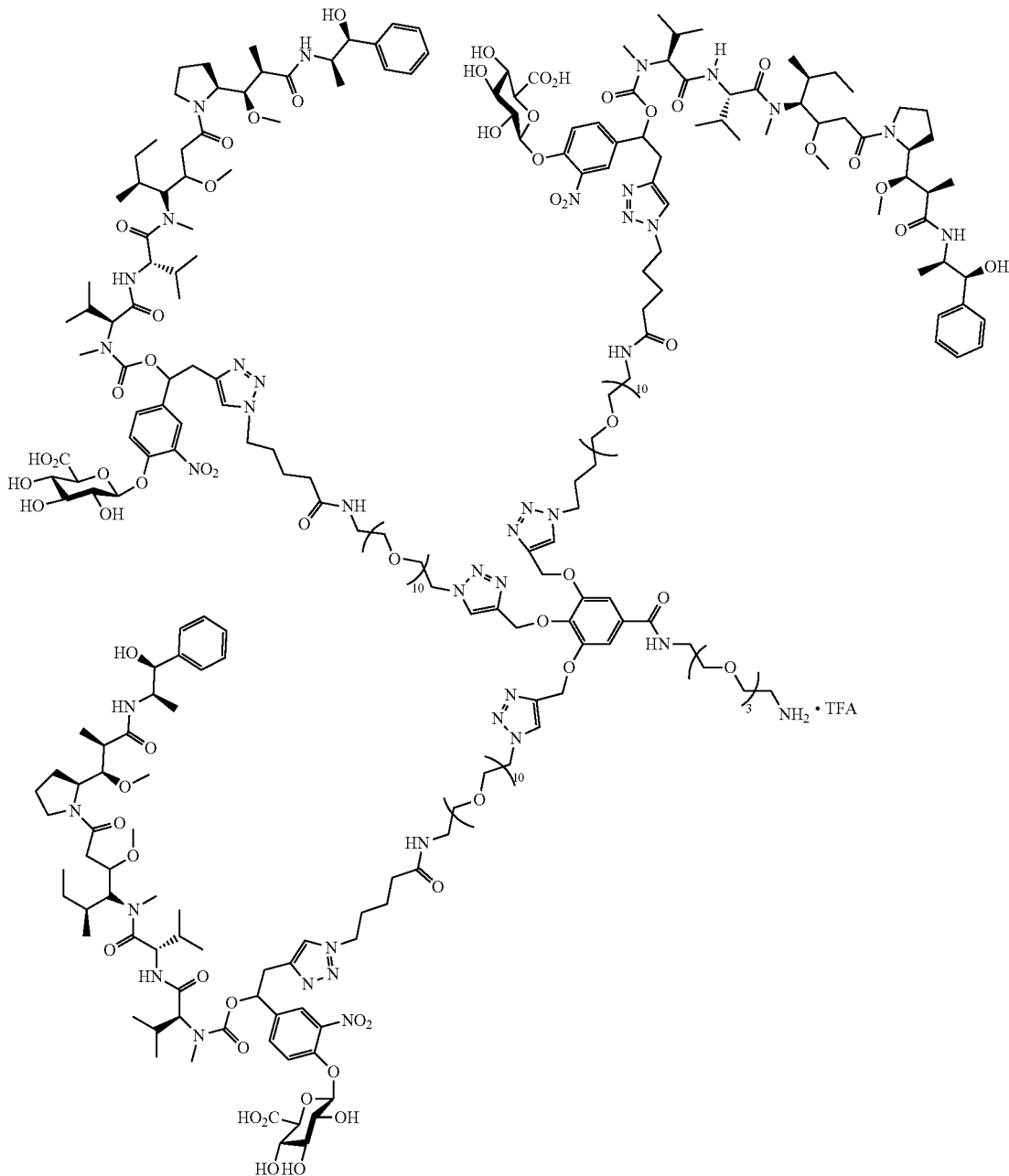

14

CuSO$_4$ (5.7 mg, 0.0356 mmol, 3.5 equiv.) and sodium ascorbate (7.0 mg, 0.0356 mmol, 3.5 equiv.) was added to a solution of alkyne 13 (34 mg, 0.030 mmol, 3 equiv.) and azide 11 (30 mg, 0.01187 mmol, 1.2 equiv.) in a degassed mixture of t-BuOH (6 mL)/H$_2$O (10 mL). The mixture was stirred for 1.5 hours at room temperature under Ar atmosphere. After Completion, the resin QuadraPure® IDA (350 mg) was added to the mixture, stirred for additional 3 hours and removed by filtration. The solvent was evaporated under reduced pressure and the crude residue was purified by reverse phase chromatography on C18 grafted silica (gradient elution MeCN/H$_2$O (0.05% TFA) 20/80 to 60/40 over 30 minutes) to give compound 14 (24 mg, 41%) as a white solid.

R$_t$: 11.97-12.09 min (Method 1)

$^1$H NMR (400 MHz, DMSO-d6) δ=8.73-7.11 (m, 39H), 5.99-5.76 (m, 3H), 5.29-5.20 (m, 3H), 5.18 (s, 4H), 5.03 (s, 2H), 4.83-4.59 (m, 1H), 4.56 (t, J=5.1 Hz, 4H), 4.51-3.89 (m, 30H), 3.83 (t, J=5.2 Hz, 4H), 3.81-3.72 (m, 3H), 3.69-3.35 (m, 148H), 3.34-3.10 (m, 44H), 3.10-2.69 (m, 17H), 2.62-2.53 (m, 1H), 2.47-2.35 (m, 5H), 2.31-2.19 (m, 2H), 2.19-1.89 (m, 14H), 1.89-1.62 (m, 15H), 1.61-1.11 (m, 16H), 1.09-0.93 (m, 21H), 0.92-0.71 (m, 45H), 0.71-0.51 (m, 12H), 0.44 (d, J=6.4 Hz, 3H).

$^{19}$F NMR (376 MHz, DMSO-d6) δ=−74.53.

$^{13}$C NMR (400 MHz, DMSO-d6) δ=172.36, 172.29, 171.74, 169.89, 169.84, 168.71, 165.46, 158.27, 157.92, 151.60, 148.60, 143.65, 143.21, 142.50, 139.24, 129.64, 127.79, 127.73, 126.72, 126.64, 126.44, 126.39, 126.34, 124.78, 124.70, 123.01, 122.62, 106.83, 99.64, 85.42, 81.61, 75.81, 75.42, 74.77, 72.72, 71.13, 69.75, 69.61, 69.55, 69.15, 69.04, 68.68, 66.68, 65.53, 62.41, 60.91, 60.27, 58.65, 58.13, 57.14, 54.99, 54.18, 49.74, 49.47, 49.31, 48.91, 47.20, 46.23, 43.74, 43.18, 38.65, 38.46, 34.40, 31.57, 29.41, 29.28, 25.34, 24.33, 23.10, 22.13, 22.00, 18.71, 18.59, 17.97, 15.61, 15.43, 15.27, 14.99, 10.39, 10.34.

HRMS (ESI+): $[M+7H]^{7+}$ calcd for $C_{273}H_{442}N_{41}O_{94}$: 828.4417 measured 828.4419; $[M+6H]^{6+}$ calcd for $C_{273}H_{441}N_{41}O_{94}$: 966.3475 measured 966.3468; $[M+5H]^{5+}$ calcd for $C_{273}H_{440}N_{41}O_{94}$: 1159.4155 measured 1159.4154.

8. Synthesis of RC-Alb

Et$_3$N (0.94 μL, 0.00677 mmol, 4 equiv.) was added to a solution of amine 14 (10 mg, 0.00169 mmol, 1 equiv.) and NHS ester 15 (0.57 mg, 0.00186 mmol, 1.1 equiv.) in dry DMSO (1 mL). The mixture was stirred at room temperature for 7 hours. After completion, the solvent was evaporated under reduced pressure and the crude residue was purified by reverse phase chromatography on C18 grafted silica (gradient elution MeCN/H$_2$O (0.05% TFA) 20/80 to 80/20 over 30 minutes) to afford RC-Alb (9.9 mg, 98%, purity >98%) as a white solid.

$R_t$: 12.80-12.92 min (Method 1)

HRMS (ESI+): $[M+6H]^{6+}$ calcd for $C_{283}H_{452}N_{42}O_{97}$: 998.5263 measured 998.5261; $[M+5H]^{5+}$ calcd for

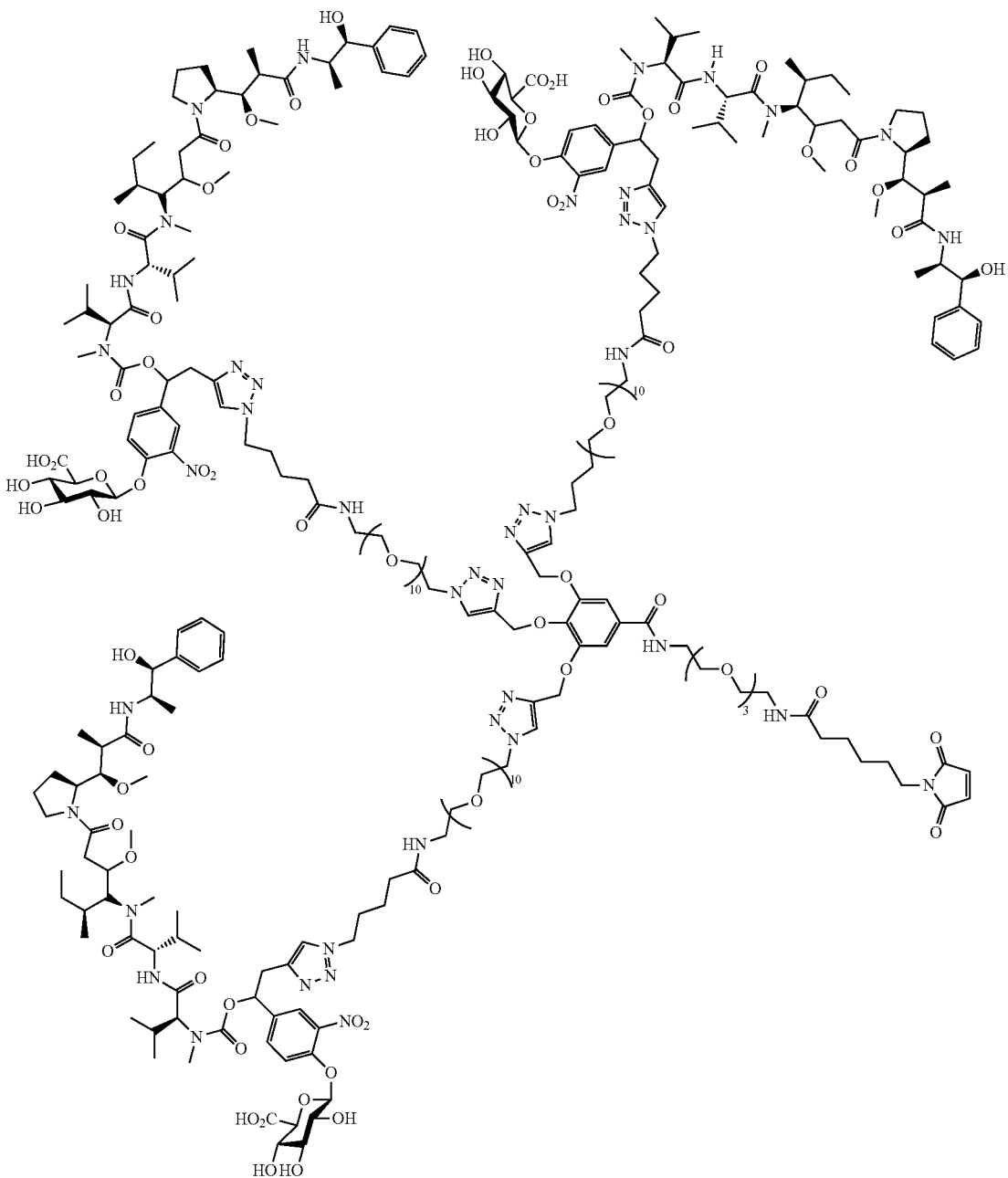

$C_{263}H_{451}N_{42}O_{97}$: 1198.0301 measured 1198.0306; $[M+4H]^{4+}$ calcd for $C_{283}H_{450}N_{42}O_{97}$: 1497.2858 measured 1497.2857.

Biology

Cells: MIA PaCa-2 human pancreatic cell line was obtained from the American Type Culture Collection and stably transfected to express luciferase gene by Trichet's team, INSERM Nantes, France.

Experimental in vivo procedures: Female, 6 to 8 week-old Nude mice were purchased from Charles River Laboratories. Mice were acclimated for 7 days in the laboratory before experimentation and were maintained in sterilized filter-stopped cages inside a controlled ventilated rack and had access to food and water ad libitum. All experimental procedures involving animals were validated by the regional ethical comity (CECCO no. 3) and carried out in accordance with the guidelines of the French Agriculture and Forestry Ministry (decree 2013-118) and of the European Communities Council Directive (2010/63/UE). All along the studies, mice were examined at least 3 times a week for clinical signs, distress, decreased physical activity and body weight as indicators of the health status.

In vivo efficacy on orthotopic models: Considering the obvious ethical issues, evaluation of new therapies and the understanding of biological mechanisms must be obtained from animal models. These animal studies correspond to the stage of proof of concept for the molecules which could be tested in clinical phase I and II. A key step in this preclinical process is to use a suitable model taking into account the clinical reality. A lack of clinical reality leads to a significant lack of predictability and a risky extrapolation of the results obtained in vivo in humans. It is necessary, to evaluate the efficiency of anti-tumour therapies, to perform these studies on orthotopic models. Orthotopic models have the advantage of being more predictive of tumour development in humans. The tumours growing in the original primary tumour tissue, these models are much closer to clinical pathological situation. Given the complexity of the processes involved, including interactions with the tumour microenvironment, no reliable method of replacement is available.

Human pancreatic cancer xenografts from the pancreatic cancer cell line MIA PaCa2-luc were established in Swiss Nude mice by orthotopic implantation. Mice were anesthetized by inhalation of 1.5% isoflurane with air. Abdomens of mice were prepared with a solution of povidone iodine (Betadine). A small transverse incision was made in the left lateral flank through the skin and peritoneum. The tip of pancreatic tail was gently grasped and pancreas/spleen were externalized in a lateral direction to be fully exposed. The needle was inserted into the tail of pancreas and positioned in the pancreatic head region. The inoculum ($2 \times 10^6$ MIA PaCa2-luc cells in 10 µL of PBS) was slowly injected using a 27-gauge needle of a Hamilton syringe. The spleen was then returned to the appropriate position in abdomen, peritoneum closed with 7-0 sutures and skin closed with 4-0 sutures.

Treatment of pancreatic tumours: Mice (8 animals per group) received intravenous injections of a 5% DMSO and 95% PBS mix (vehicle group), 2 mg/kg of BR-Alb, 4.32 mg/kg of RC-Alb or 6.48 mg/kg of RC-Alb at days 37, 44, 50 and 64. Tumour volumes were determined by ultrasound imaging.

Ultrasound imaging: Mice were anesthetized by inhalation of 1.5% isoflurane with air and placed on a thermostatically controlled heating pad with the paws taped over the ECG electrodes attached to the table. Respiratory gating, derived from ECG, allows avoiding artefacts due to respiratory movements of the animal. Temperature of the animals was recorded with an internal temperature probe. An aqueous warmed ultrasonic gel (purchased from Supragel) was applied to the skin overlying the skin to optimize the visualization of internal organs. Tumours were imaged with the Vevo LAZR system (FUJIFILM Visualsonics Inc.). A transducer with central frequency at 40 MHz, providing axial resolution of 40 µm with a 14.1×15 mm field of view, was used for imaging of smaller tumours. A transducer with central frequency at 21 MHz, providing axial resolution of 75 µm with a 23.1×36 mm field of view, was used for larger tumour imaging. 3D scans of ultrasound image were recorded digitally and reviewed. The tumour area in a coronal plane was measured by manually delineating margins using Vevo LAB1.7.2 software (FUJIFILM Visaulsonics Inc.). The software then calculated the corresponding volume from each coronal slice, the threshold of detection ranging from 0.5 $mm^3$ to 1.5 $mm^3$ depending upon the tumour location.

As explained above, RC-Alb is able to vectorise three molecules of MMAE intro the microenvironment of the solid tumors. RC-Alb consists of: 1) a maleimide that allows the creation of a covalent bond with the plasma albumin into the blood flow, 2) a gallic acid structure that makes the link between the maleimide function and the three glucuronylated units, and 3) three linkers that will lead to the selective release of the active agents into the tumor microenvironment through the action of the beta-glucuronidase.

The therapeutic activity of RC-Alb was assessed as explained above for mice (FIG. 1). The results show that RC-Alb leads to an outstanding anticancer activity without any side effects. Moreover, the use of RC-Alb at 6.48 mg/kg leads to a full regression of the tumor mass for 38% of the treated animals.

The therapeutic activity of RC-Alb was also compared to the activity of the corresponding monomer BR-Alb (that carries a single MMAE molecule)(FIG. 2). When both compounds are administered at the same dose ($1.1 \times 10^{-6}$ mol/kg), RC-Alb leads to a 18-fold reduction of the tumor volume in comparison with BR-Alb.

Other Compounds According to the Invention
1. Synthesis of YG-Alb and AB-Alb
With the aim to evaluate the impact of the maleimide moiety on the toxicity of trimeric glucuronide prodrugs, the two compounds YG-Alb and AB-Alb have been prepared as described below:
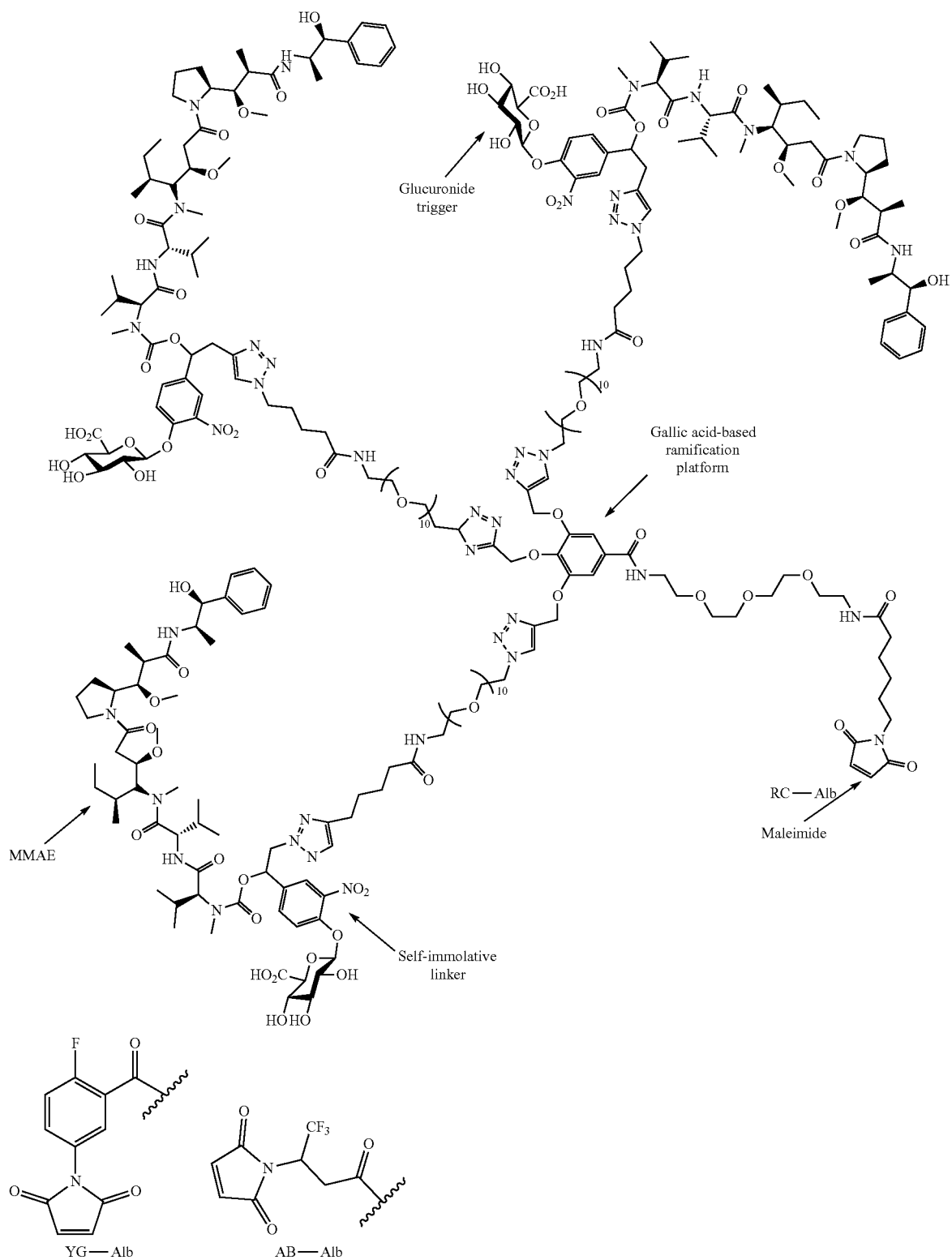

1.1. Preparation of YG-Alb

The synthesis of 5-(2,5-dioxo-2,5-dihydro-1H-pyrrol-1-yl)-2-fluorobenzoic acid 15 was achieved using the published protocol (WO 2016054315).

a) 2,5-dioxopyrrolidin-1-yl 5-(2,5-dioxo-2,5-dihydro-1H-pyrrol-1-yl)-2-fluorobenzoate 16

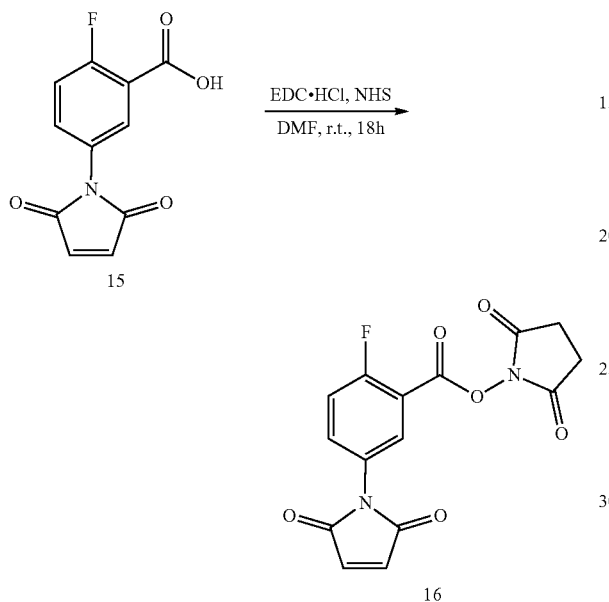

To a stirred solution of 5-(2,5-dioxo-2,5-dihydro-1H-pyrrol-1-yl)-2-fluorobenzoic acid 15 (602 mg, 2.56 mmol, 1.0 eq.) in anhydrous DMF (3 mL) were added NHS (352 mg, 3.06 mmol, 1.2 eq.) and EDC hydrochloride (590 mg, 3.08 mmol, 1.2 eq.). The reaction mixture was allowed to stir at room temperature overnight. The solvent was removed under vacuum. The crude was taken up in DCM (15 mL) and washed successively with 0.1N aqueous HCl (10 mL) and water (2×10 mL). The organic layer was dried over magnesium sulfate, filtrated and evaporated. The crude was purified by flash silica gel column chromatography using a gradient DCM/AcOEt 50/50 to 0/100 to afford the activated ester 16 as a beige solid (468 mg, 1.41 mmol). Yield: 55%.

b) YG-Alb

To a stirred solution of compound 14 (10.3 mg, 1.78 µmol, 1.0 eq.) in anhydrous DMSO (2 mL) were added 2,5-dioxopyrrolidin-1-yl 5-(2,5-dioxo-2,5-dihydro-1H-pyrrol-1-yl)-2-fluorobenzoate 16 (1.8 mg, 5.33 µmol, 3.0 eq.) and triethylamine (1.5 µL, 10.8 µmol, 6.0 eq.). The reaction mixture was allowed to stir at room temperature overnight. The solvent was removed under vacuum. The crude purified by flash reverse phase (C18) silica gel column chromatography using a gradient $H_2O$+0.05% TFA/ACN 90/10 to 40/60 to afford after freeze drying, compound YG-Alb (5.1 mg, 0.854 µmol). Yield: 48%. HRMS m/z $[M+4H]^{4+}$ calculated: 1504.0271, found: 1504.0273, $[M+5H]^{5+}$ calculated: 1203.2225, found: 1203.2224, $[M+6H]^{6+}$ calculated: 1003.0205, found: 1003.0204.

1.2. Preparation of AB-Alb

The synthesis of 3-(2,5-dioxo-2,5-dihydro-1H-pyrrol-1-yl)-4,4,4-trifluorobutanoic acid 17 was achieved using the published protocol Bioconjugate. Chem., 2015, 26, 145-152.

a) 2,5-dioxopyrrolidin-1-yl 3-(2,5-dioxo-2,5-dihydro-1H-pyrrol-1-yl)-4,4,4-trifluorobutanoate 18

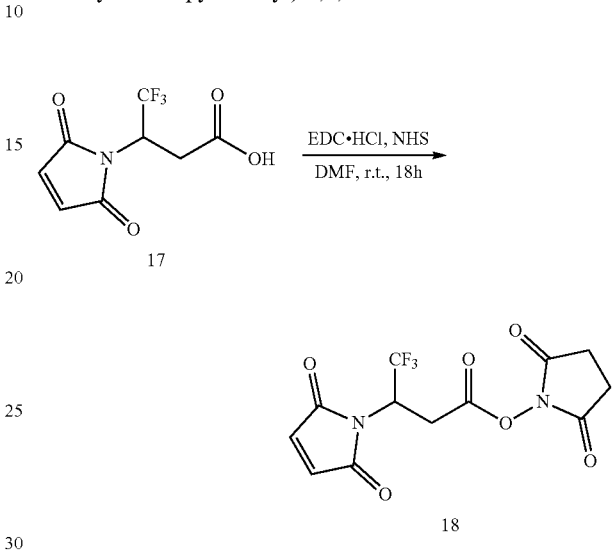

To a stirred solution of 3-(2,5-dioxo-2,5-dihydro-1H-pyrrol-1-yl)-4,4,4-trifluorobutanoic acid 17 (500 mg, 2.51 mmol, 1.0 eq.) in anhydrous DMF (3 mL) were added NHS (291 mg, 2.53 mmol, 1.2 eq.) and EDC hydrochloride (485 mg, 3.08 mmol, 1.2 eq.). The reaction mixture was allowed to stir at room temperature overnight. The solvent was removed under vacuum. The crude was purified by flash silica gel column chromatography using a gradient DCM/MeOH 100/0 to 75/25 to afford the activated ester 18 as a white solid (487 mg, 1.46 mmol). Yield: 58%.

b) AB-Alb

To a stirred solution of compound 14 (10.5 mg, 1.78 µmol, 1.0 eq.) in anhydrous DMSO (2 mL) were added 2,5-dioxopyrrolidin-1-yl 3-(2,5-dioxo-2,5-dihydro-1H-pyrrol-1-yl)-4,4,4-trifluorobutanoate 18 (1.8 mg, 5.33 µmol, 3.0 eq.) and triethylamine (1.5 µL, 10.8 µmol, 6.0 eq.). The reaction mixture was allowed to stir at room temperature overnight. The solvent was removed under vacuum. The crude purified by flash reverse phase (C18) silica gel column chromatography using a gradient $H_2O$+0.05% TFA/ACN 90/10 to 40/60 to afford after freeze drying, compound AB-Alb (6.4 mg, 1.06 µmol). Yield: 60%. HRMS m/z $[M+4H]^{4+}$ calculated: 1504.5263, found: 1504.5269, $[M+5H]^{5+}$ calculated: 1203.6219, found: 1203.6224, $[M+6H]^{6+}$ calculated: 1003.3533, found: 1003.3529.

2. MTD Studies

Maximal Tolerated Dose studies (MTD): MTD studies were performed on BALB/c Nude mice (n=3). A single administration of prodrugs RC-Alb, YG-Alb and AB-Alb (9.72 mg/kg or 12.96 mg/kg) was performed by intravenous injection. Toxicity of prodrugs was evaluated by the maximum weight loss or gain, expressed as a percentage of the initial weight of the animals.

A dose was considered as toxic if the relative weight loss was greater than 20% of initial weight.

The results are shown in FIGS. 3 and 4.

The comparative MTD studies conducted with RC-Alb, YG-Alb and AB-Alb show that the structure of the maleimide moiety has an effect on the toxicity of glucuronide prodrugs in mice. Thus, prodrugs YG-Alb and AB-Alb that bear electron withdrawing groups such as F and $CF_3$ are less toxic than RC-Alb in which this kind chemical function is lacking.

The invention claimed is:

1. A compound having the following formula (I):

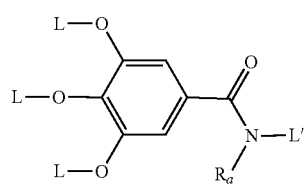

(I)

wherein:

$R_a$ represents H or a $(C_1-C_{12})$alkyl group, optionally interrupted with one or several oxygen atoms;

L represents a group having the following formula (II):

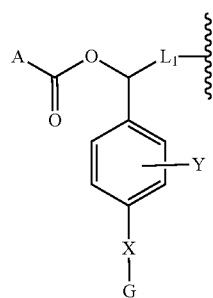

(II)

wherein:

A is an anticancer agent;

Y is an electron-withdrawing group;

X is —O—;

G is a glucuronyl radical or a derivative thereof;

$L_1$ represents a linker represented by the following formula (III):

$-A_1-A_2-A_3-A_4-A_5-A_6-A_7-$ (III)

wherein:

$A_1$ is an $(C_1-C_6)$alkylene radical;

$A_2$ is a triazole radical;

$A_3$ is an $(C_1-C_6)$alkylene radical;

$A_4$ is chosen from the group consisting of: —C(=O)—$NR_b$—, —C(=S)—$NR_b$—, —$NR_b$—C(=O)—, —$NR_b$—C(=S)—, and $NR_b$, $R_b$ representing H or a $(C_1-C_{12})$alkyl group;

$A_5$ is an $(C_1-C_{32})$alkylene radical interrupted by at least on oxygen atom;

$A_6$ is a triazole radical;

$A_7$ is an $(C_1-C_6)$alkylene radical;

L' represents a group having the following formula (IV):

$-A_8-A_9-L''$ (IV)

wherein:

$A_8$ is an $(C_1-C_6)$alkylene radical interrupted by at least one oxygen atom;

$A_9$ is chosen from the group consisting of: —$NR_c$—, —O—, and —S—, $R_c$ representing H or a $(C_1-C_{12})$alkyl group; and L" is a maleimidocaproyl group or a radical having one of the following formulae:

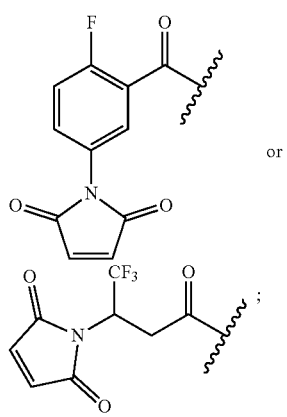

or a pharmaceutically acceptable salt thereof, or a racemate, diastereomer or enantiomer thereof.

2. The compound of claim 1, wherein L has the following formula (VII):

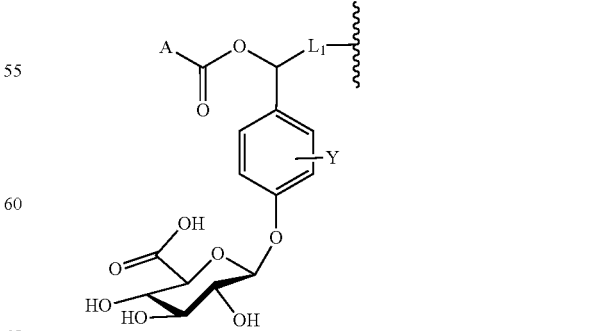

(VII)

A, Y, and $L_1$ being as defined in claim 1.

3. The compound of claim 1, wherein L has the following formula (VIII):

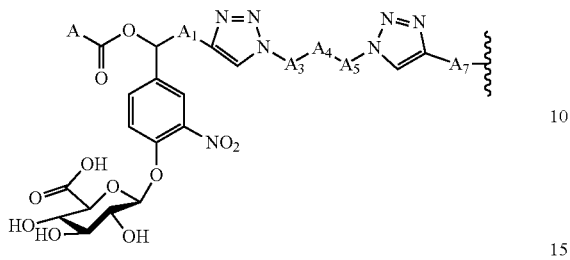
(VIII)

A, $A_1$, $A_3$, $A_4$, $A_5$, and $A_7$ being as defined in claim 1.

4. The compound of claim 3, wherein $A_5$ represents a group of formula —$CH_2$—($CH_2$—O—$CH_2$)$_n$—$CH_2$—, n being an integer comprised from 1 to 12.

5. The compound of claim 1, wherein L has the following formula (IX):

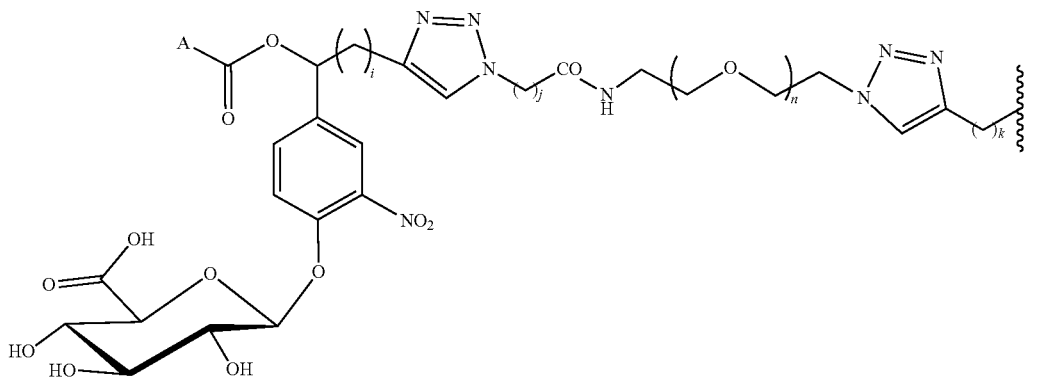
(IX)

i being an integer comprised from 1 to 6, j being an integer comprised from 1 to 10, n being an integer comprised from 1 to 12, and k being an integer comprised from 1 to 6.

6. The compound of claim 1, wherein the anticancer agent is the monomethyl auristatin E (MMAE) or a derivative thereof.

7. The compound of claim 1, wherein $A_8$ represents a group of formula —$CH_2$—($CH_2$—O—$CH_2$)$_m$—$CH_2$—, m being an integer comprised from 1 to 12.

8. The compound of claim 1, wherein L' has the following formula (X):

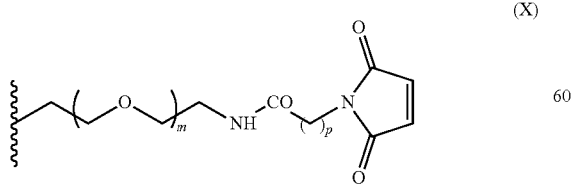
(X)

m being an integer comprised from 1 to 6, and p being an integer comprised from 1 to 6.

9. The compound of claim 1, having the following formulae (XI), (XI') or (XI''):
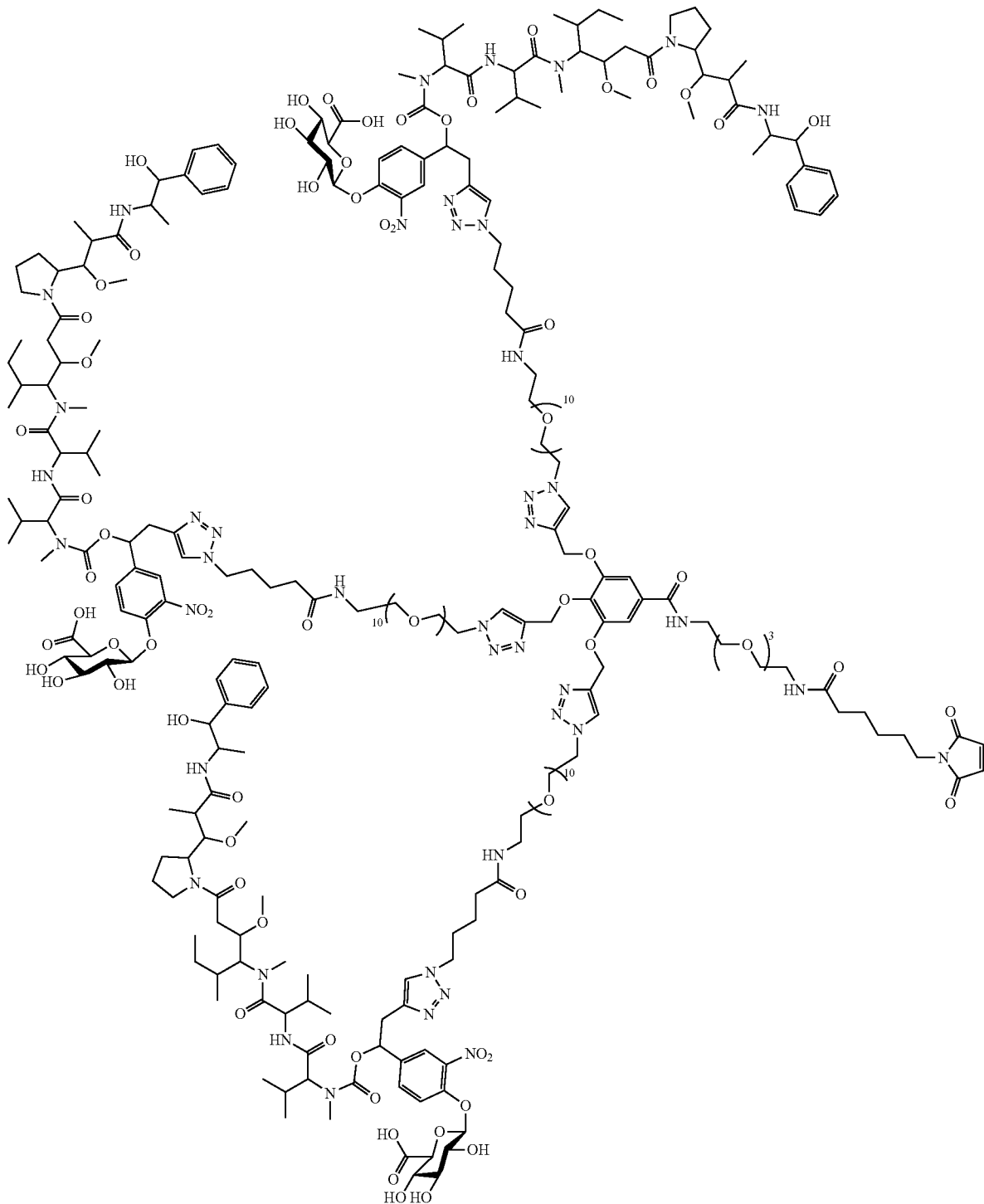
(XI)

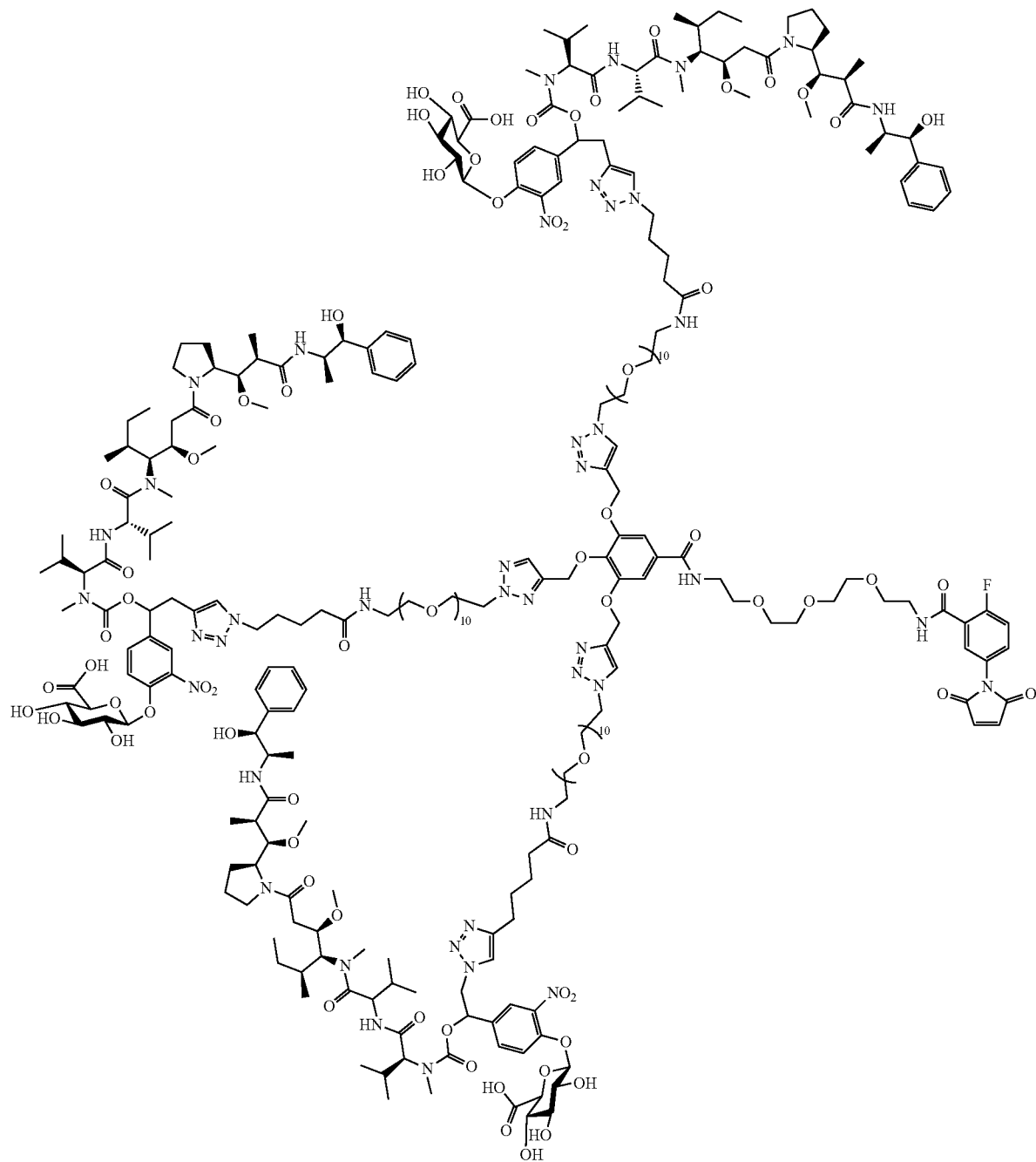
(XI')

(XI″)

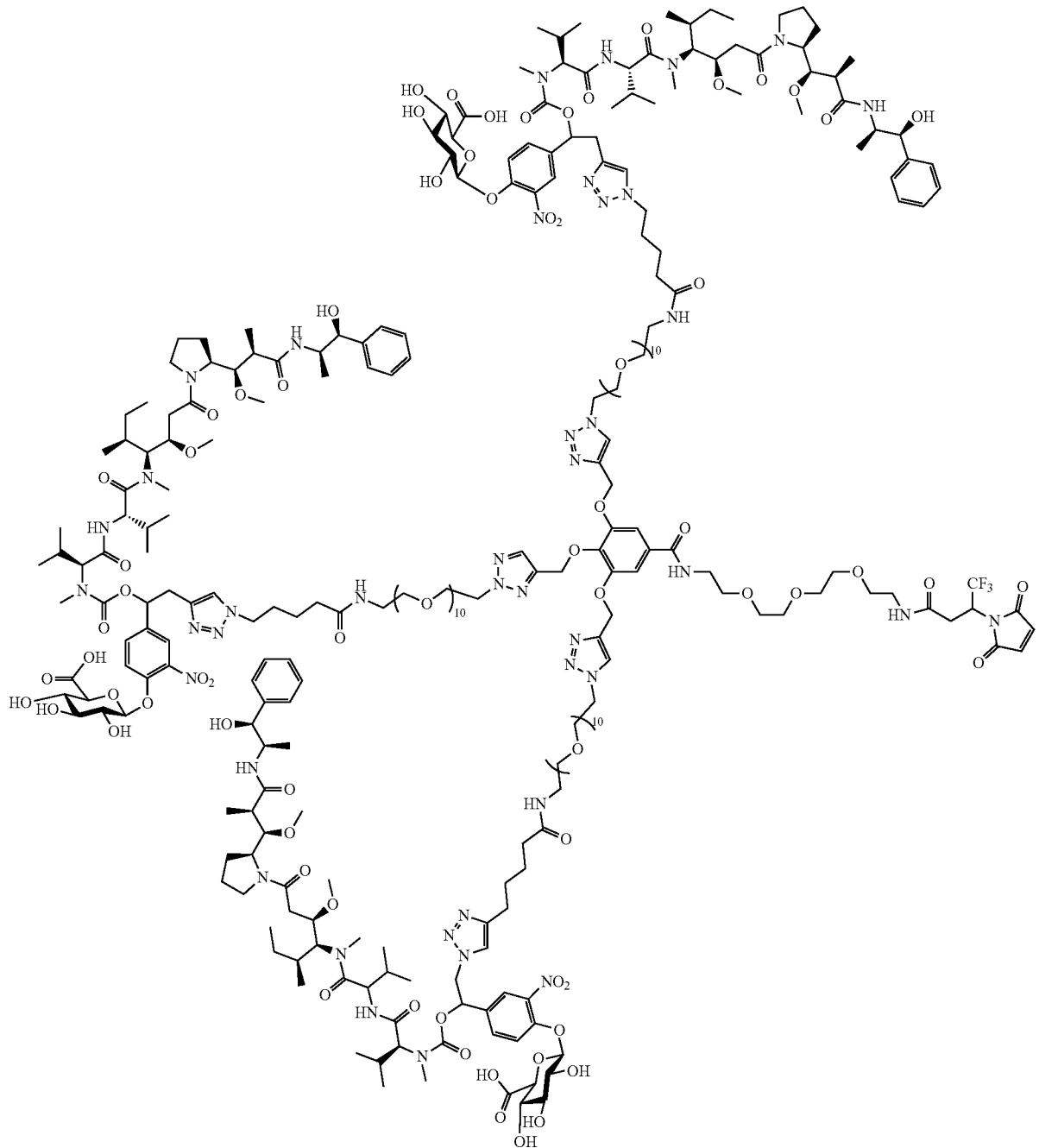

10. A prodrug comprising the compound of claim 1 linked through a covalent bond to albumin or a derivative or fragment thereof.

11. A drug comprising the compound of claim 1, for its use as a drug.

12. A pharmaceutical composition, comprising a compound according to claim 1 or a pharmaceutically acceptable salt thereof, and also at least one pharmaceutically acceptable excipient.

13. A method for treating and/or preventing cancer, comprising the administration of a pharmaceutically acceptable amount of the compound of claim 1 to a patient in need thereof.

14. A drug comprising the prodrug of claim 10.

15. A pharmaceutical composition, comprising the prodrug of claim 10, or a pharmaceutically acceptable salt thereof, and also at least one pharmaceutically acceptable excipient.

16. A method for treating and/or preventing cancer, comprising the administration of a pharmaceutically acceptable amount of the prodrug of claim 10.

\* \* \* \* \*